US010282542B2

(12) United States Patent
Kawauchi

(10) Patent No.: US 10,282,542 B2
(45) **Date of Patent: *May 7, 2019**

(54) INFORMATION PROCESSING APPARATUS, INFORMATION PROCESSING METHOD, AND COMPUTER READABLE MEDIUM

(71) Applicant: Mitsubishi Electric Corporation, Tokyo (JP)

(72) Inventor: Kiyoto Kawauchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 275 days.

This patent is subject to a terminal disclaimer.

(21) Appl. No.: 15/025,153

(22) PCT Filed: Oct. 24, 2013

(86) PCT No.: PCT/JP2013/078774

§ 371 (c)(1),
(2) Date: Mar. 25, 2016

(87) PCT Pub. No.: WO2015/059791

PCT Pub. Date: Apr. 30, 2015

(65) Prior Publication Data

US 2016/0239661 A1 Aug. 18, 2016

(51) Int. Cl.
*H04L 29/06* (2006.01)
*G06F 21/55* (2013.01)
*G06F 21/57* (2013.01)

(52) U.S. Cl.
CPC ............ *G06F 21/55* (2013.01); *G06F 21/577* (2013.01); *H04L 63/1416* (2013.01); *H04L 63/1425* (2013.01)

(58) Field of Classification Search
CPC ................. G06F 21/56; H04L 63/14–63/1491
See application file for complete search history.

(56) References Cited

U.S. PATENT DOCUMENTS 7,234,166 B2 6/2007 Nurmela
7,568,232 B2 7/2009 Mitomo et al.
(Continued)

FOREIGN PATENT DOCUMENTS

EP 1 418 484 A2 5/2004
EP 2 028 527 A1 2/2009
(Continued)

OTHER PUBLICATIONS

Ning et al., "Constructing Attack Scenarios through Correlation of Intrusion Alerts", Proceedings of the 9th ACM conference on Computer and communications security. ACM, 2002, 10 pages.
(Continued)

*Primary Examiner* — Thaddeus J Plecha
(74) *Attorney, Agent, or Firm* — Birch, Stewart, Kolasch & Birch, LLP

(57) ABSTRACT

An attack activity definition information database 111 stores, for a plurality of events, attack activity definition information describing an event, a precondition, and an achieved phenomenon. The event is observed by an information system when an attack against the information system is underway. The precondition is a prerequisite condition for the event to be observed. The achieved phenomenon is a phenomenon of the time after the event is observed. An event receiving part 108 receives observed event notice information notifying an observed event which is observed by the information system. An attack activity predicting part 105 acquires an achieved phenomenon from the attack activity definition information describing the observed event notified by the observed event notice information, and extracts an event that is predicted to be observed by the information system, based on the attack activity definition information describing a precondition corresponding to the acquired achieved phenomenon of the observed event.

15 Claims, 29 Drawing Sheets

(56) References Cited

U.S. PATENT DOCUMENTS

| | | | | |
|---|---|---|---|---|
| 7,603,709 | B2 * | 10/2009 | Lewis | H04L 63/0227 726/23 |
| 7,716,739 | B1 | 5/2010 | McCorkendale | |
| 8,166,553 | B2 | 4/2012 | Kubota | |
| 8,800,037 | B2 | 8/2014 | Paek et al. | |
| 2002/0078381 | A1 | 6/2002 | Farley et al. | |
| 2003/0219008 | A1 * | 11/2003 | Hrastar | H04L 63/1408 370/352 |
| 2004/0093510 | A1 | 5/2004 | Nurmela | |
| 2005/0086538 | A1 | 4/2005 | Kubota | |
| 2005/0193430 | A1 * | 9/2005 | Cohen | G06F 21/577 726/25 |
| 2005/0241000 | A1 | 10/2005 | Kawauchi | |
| 2005/0289649 | A1 | 12/2005 | Mitomo et al. | |
| 2008/0109905 | A1 * | 5/2008 | Grosse | H04L 63/1458 726/23 |
| 2009/0307777 | A1 | 12/2009 | He et al. | |
| 2011/0321175 | A1 * | 12/2011 | Slater | G06F 21/552 726/28 |
| 2012/0096552 | A1 | 4/2012 | Paek et al. | |
| 2013/0019309 | A1 * | 1/2013 | Strayer | G06N 5/04 726/23 |
| 2017/0142145 | A1 * | 5/2017 | Bu er | G06F 21/554 |
| 2017/0187730 | A1 * | 6/2017 | Singla | H04L 63/1416 |
| 2017/0230409 | A1 * | 8/2017 | Ahmed | G06F 17/30312 |
| 2018/0069876 | A1 * | 3/2018 | Ben Ezra | H04L 63/1433 |

FOREIGN PATENT DOCUMENTS

| | | | |
|---|---|---|---|
| EP | 2 453 381 | A2 | 5/2012 |
| JP | 2004-145413 | A | 5/2004 |
| JP | 2005-316779 | A | 11/2005 |
| JP | 2005-341217 | A | 12/2005 |
| JP | 2006-350543 | A | 12/2006 |
| JP | 4020912 | B2 | 12/2007 |
| JP | 2008-167099 | A | 7/2008 |
| JP | 2009-129332 | A | 6/2009 |
| JP | 2012-68903 | A | 4/2012 |
| JP | 2012-133407 | A | 7/2012 |
| WO | WO 03/100619 | A1 | 12/2003 |

OTHER PUBLICATIONS

Office Action dated Feb. 20, 2019 in corresponding European Application No. 13 896 096.8.

* cited by examiner

```
     [PRECONDITION]
     hasSecret( A,  H )

317——[MONITOR SETTING]
318——COMMAND: MONITOR_POST_INTERVAL
319——MONITORING TARGET APPARATUS: $X  [ siem(X) ]——322
     BOOT LIKELIHOOD: 0.5 ——323
320——COMMAND PARAMETER
321——FROM=$H                                              ——302

     [EVENT]
     EVENT SOURCE: $_  ——316
     EVENT TYPE: PERIODICAL_HTTP_POST
     EVENT PARAMETER
     USER=$A
     DEST_URL=$U

     [ACHIEVED PHENOMENON]
     leak( A, U )

     [ATTACK LIKELIHOOD]
     0.3
```

Fig. 8

| ACHIEVED PHENOMENON |
|---|
| login( "alice", "host001" ) |
| hasSecret( "bob", "file_serverA" ) |
| ... |

| GOAL | CONDITION |
|---|---|
| canRead(U, F) | readPermission(F, G), belongs(U, G) |
| ... | |

701, 702, 703, 704, 705

INFORMATION PROCESSING APPARATUS, INFORMATION PROCESSING METHOD, AND COMPUTER READABLE MEDIUM

TECHNICAL FIELD

The present invention relates to a technique for detecting an attack against an information system.

BACKGROUND ART

A conventional attack detection system epitomized by an IDS (Intrusion Detection System) determines that an attack against an information system is underway when a single event occurs.

Lately, an attack in which malware takes over a terminal and makes an attack by spoofing the user of the terminal is becoming influential.

Therefore, it is becoming difficult nowadays to determine from a single event that an attack against an information system is underway.

For cases where it is difficult to determine from a single event whether or not an attack is underway, a scheme (for example, Patent Literature 1) has been proposed. This scheme defines an event sequence (attack scenario) which is expected to be caused by a series of attack activities and regards that an attack is underway when events corresponding to the attack scenario occur.

Another scheme (for example, Patent Literature 2) has also been proposed. This scheme defines a logic tree whose root is an attacking phenomenon to be detected and whose node or leaf is a phenomenon which might occur before the attacking phenomenon. This scheme regards that an attack is underway if an attacking phenomenon is satisfied after mapping the phenomena that have occurred, on the logic tree.

Still another scheme (for example, Non-Patent Literature 1) has also been proposed. This scheme defines a precondition and a result for an attack notice from an intrusion detection apparatus. When a plurality of attack notices are raised, if the results of the preceding attack notices satisfy the precondition of the following attack notices, this scheme regards that these attack notices are associated with each other.

CITATION LIST

Patent Literature

Patent Literature 1: JP 4020912
Patent Literature 2: JP 2006-350543

Non-Patent Literature

Non-Patent Literature 1: Ning, Peng, Yun Cui, and Douglas S. Reeves. "Constructing attack scenarios through correlation of intrusion alerts." Proceedings of the 9th ACM conference on Computer and communications security. ACM, 2002.

SUMMARY OF INVENTION

Technical Problem

For example, in the attack detection system indicated in Patent Literature 1, the attack scenario as a criterion of an attack determination needs to be defined in advance.

A countless number of attack scenarios can be generated only by slightly exchanging the order of attacks or anticipated attacking techniques. Therefore, it is difficult to cover all the attack scenarios.

There is a problem that when there is an additional event that may occur because of, for example, introduction of a new monitoring target apparatus or discovery of a new attacking technique, all the existing scenarios need be modified.

In the attack detection system indicated in Patent Literature 2, there is a problem that when there is an additional event that may occur, the existing logic tree need be modified.

As for the method indicated in Non-Patent Literature 1, although it is free from the above constraints, problems as follows still exist.

In order to detect an attack with spoofing the user, it is sometimes necessary to practice monitoring that puts heavy load to the monitoring target apparatus, or monitoring that can involve many false detections.

To constantly practice such monitoring requires a computer cost or running cost and is not realistic accordingly.

Desirably, such monitoring is performed only when it is absolutely necessary (when monitoring enables detection of an event with a strong possibility) and for a monitoring target that is limited as much as possible (for example, only a specific terminal).

According to Non-Patent Literature 1, however, a type of attack notice that may occur next is not expected. Therefore, the monitor setting cannot be changed as needed.

The present invention is mainly aimed at solving the above problems, and has as its major objective to implement a configuration that can predict an event to be observed by an information system without preparing attack scenarios and a logic tree in advance.

Solution to Problem

An information processing apparatus according to the present invention includes:

- an event stage information storage part which stores, for a plurality of events, event stage information describing an event, a pre-event stage, and a post-event stage, the event being observed by an information system when an attack against the information system is underway, the pre-event stage being a stage of a progress of an attack before the event is observed, the post-event stage being a stage of a progress of an attack after the event is observed;
- an observed event notice information receiving part which receives observed event notice information notifying an observed event which is observed by the information system; and
- an observation predicted event extracting part which searches for event stage information describing the observed event notified by the observed event notice information, from the event stage information storage part, acquires a post-event stage of the observed event from the event stage information searched for, searches for event stage information describing a pre-event stage corresponding to the acquired post-event stage of the observed event, from the event stage information storage part, and extracts an event predicted to be observed by the information system, based on the event stage information searched for, as an observation predicted event.

Advantageous Effects of Invention

According to the present invention, event stage information describing an observed event is searched for. A post-event stage of the observed event is acquired from the event stage information searched for. Event stage information describing a pre-event stage which corresponds to the post-event stage of the observed event is searched for. Based on the event stage information searched for, an event that is predicted to be observed by an information system is extracted.

Therefore, an event to be observed by the information system can be predicted without preparing attack scenarios and a logic tree in advance.

BRIEF DESCRIPTION OF DRAWINGS

FIG. 8 is a diagram illustrating an example of an achieved phenomenon database according to Embodiment 1.

FIG. 9 is a diagram illustrating an example of an inference rule database according to Embodiment 1.

DESCRIPTION OF EMBODIMENTS

Embodiment 1

In this embodiment, an attack detection apparatus will be described that may detect an attack when a series of attack activities occur, without exhaustively preparing attack scenarios or trees in advance.

An attack detection apparatus will be described that may flexibly cope with an addition of an event which may occur because of, for example, introduction of a new monitoring apparatus or discovery of a new attacking technique.

Furthermore, an attack detection apparatus will be described that may practice monitoring that is costly to be practiced constantly, only when it is necessary.

Figure 1:
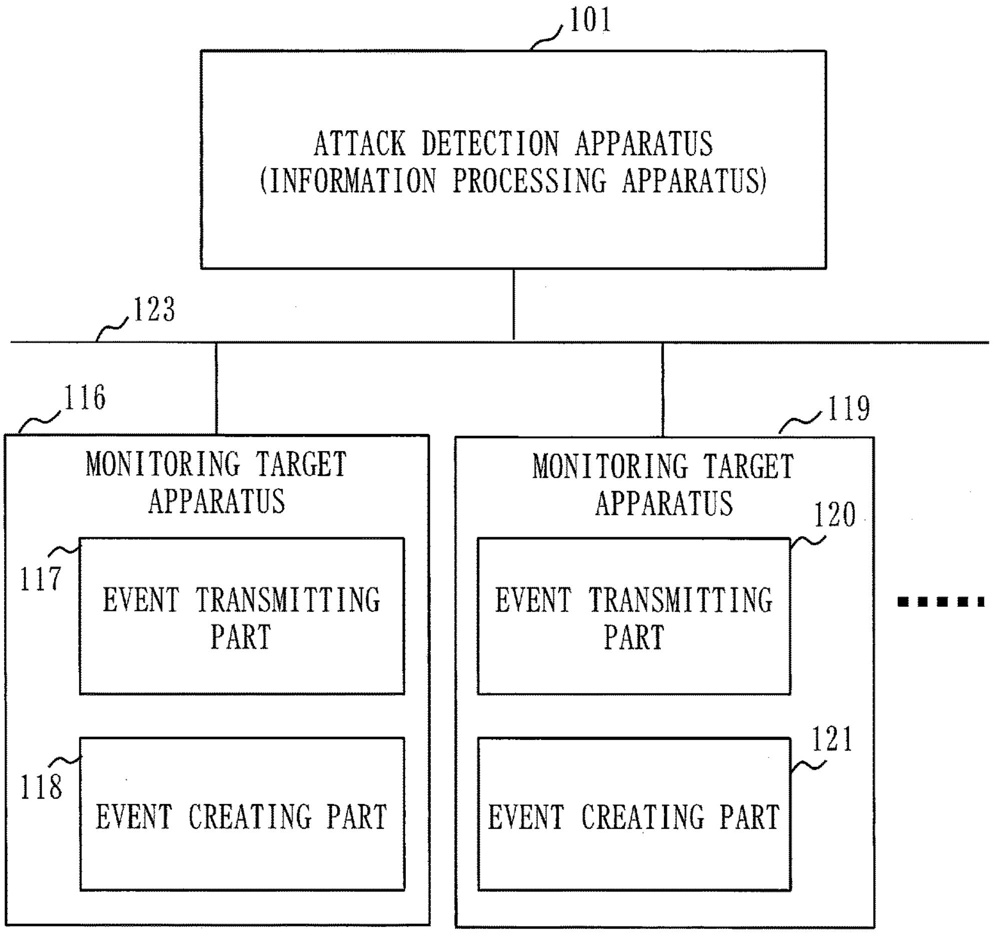
FIG. 1 is a diagram illustrating a system configuration example according to Embodiment 1.

FIG. 1 illustrates a system configuration example according to this embodiment.

Referring to FIG. 1, an attack detection apparatus 101 is connected, via a network 123, to a monitoring target apparatus which is an apparatus constituting an information system.

The attack detection apparatus 101 is an example of an information processing apparatus.

In FIG. 1, as an example, the attack detection apparatus 101 is connected to two monitoring target apparatuses 116 and 119. However, the number of monitoring target apparatuses to be connected to the attack detection apparatus 101 is not limited to two.

The monitoring target apparatus may be an IDS, a firewall, an authentication server, a file server, and an STEM (Security Information Event Management). However, the monitoring target apparatus is not limited to them.

Each monitoring target apparatus includes a function (event creating parts 118 and 121) of creating observed event notice information which notifies an event (also called an observed event) observed by the monitoring target apparatus, and a function (event transmitting parts 117 and 120) of transmitting the created observed event notice information to the attack detection apparatus 101.

The event observed by the monitoring target apparatus includes an event which has occurred in the monitoring target apparatus.

Namely, the observed event notice information notifies an event which has occurred in the monitoring target as well.

Figure 2:
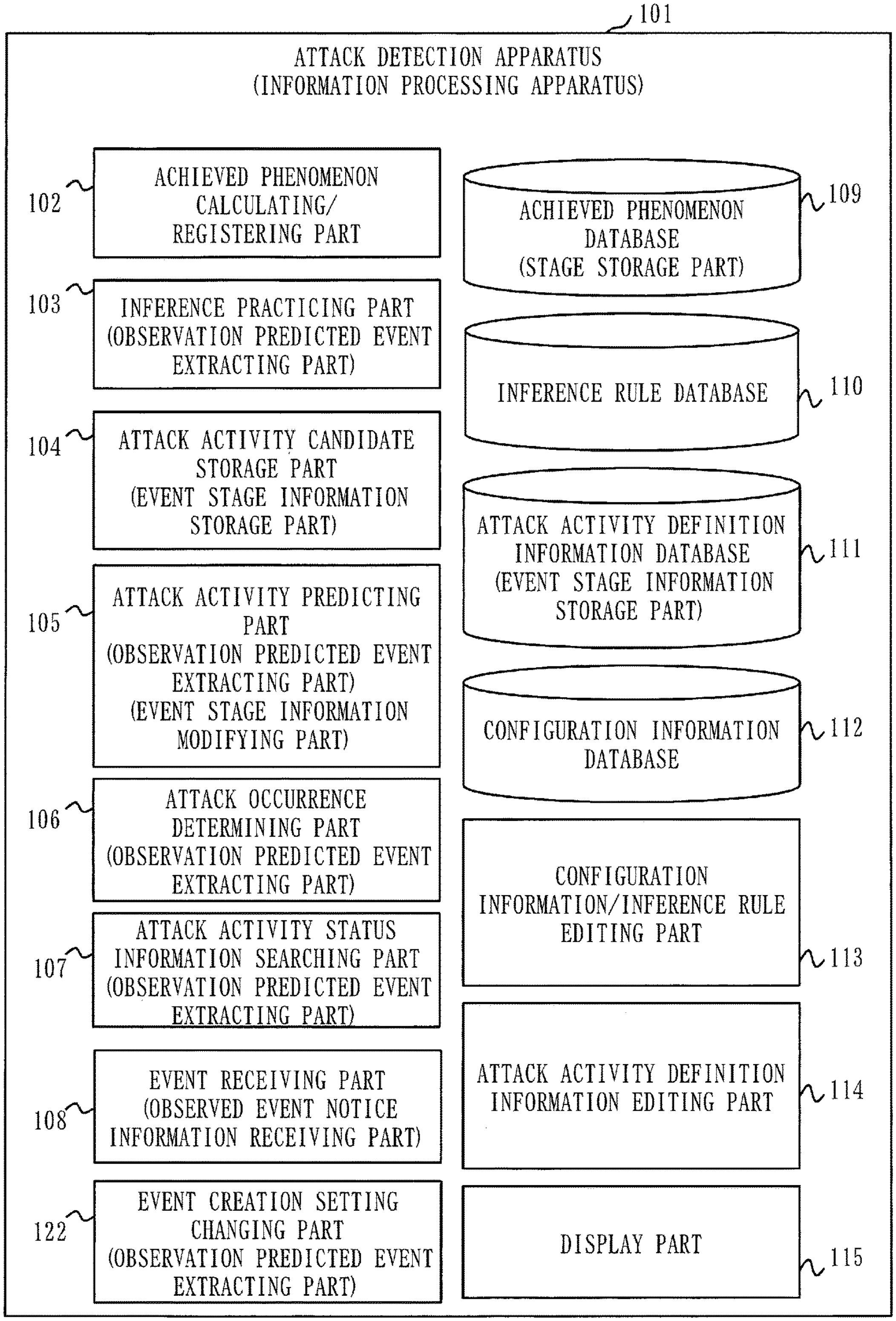
FIG. 2 is a diagram illustrating a configuration example of an attack detection apparatus according to Embodiment 1.

FIG. 2 illustrates a configuration example of the attack detection apparatus 101.

An event receiving part 108 receives the observed event notice information transmitted from the monitoring target apparatuses 116 and 119.

To "receive observed event notice information" will also be expressed as "to receive an event" hereinafter.

Based on the received observed event notice information, an attack activity status information searching part 107 searches for, or creates anew, corresponding attack activity status information (to be described later).

An attack occurrence determining part 106 determines whether or not an attack has occurred from the attack activity status information corresponding to the observed event.

As the result of the determination, if it is concluded that an attack against the information system is underway, the attack occurrence determining part 106 notifies the user that an attack is underway, via a display part 115.

If it is found that the observed event is executed as one step of a series of attacks based on the received observed event notice information, an attack activity predicting part 105 predicts an event (observation predicted event) that can be observed from now on by the information system (monitoring target apparatuses 116 and 119).

The event predicted by the attack activity predicting part 105 is stored by an attack activity candidate storage part 104.

An inference practicing part 103 is called by, for example, the attack activity predicting part 105, and practices inference computation of predicate logic or the like.

An achieved phenomenon calculating/registering part 102 creates an achieved phenomenon by a predicate logic formula based on the described contents of the attack activity status information which describes the observed event, and registers the created achieved phenomenon to an achieved phenomenon database 109.

An inference rule is stored in an inference rule database 110 by an administrator in advance.

The inference rule describes an inference logic. The inference practicing part 103 practices the inference by referring to the inference logic.

An attack activity definition information database 111 stores information, called attack activity definition information (to be described later), that defines an attack activity.

The attack activity definition information is an example of the event stage information.

A configuration information database 112 stores configuration information being information concerning the configuration of the information system.

The configuration information describes, for example, the relationship between the host name and the IP (Internet Protocol) address and the relationship between the user name and the group to which the user belongs.

A configuration information/inference rule editing part 113 registers and updates the contents of the configuration information database 112 and inference rule database 110.

An attack activity definition information editing part 114 provides a user interface to enable adding, deleting, and modifying the attack activity definition information in the attack activity definition information database 111.

An event creation setting changing part 122 requests the monitoring target apparatuses 116 and 119 to change the monitor setting in order to detect the predicted event.

The attack activity candidate storage part 104 and the attack activity definition information database 111 are examples of an event stage information storage part.

The achieved phenomenon database 109 is an example of a stage storage part.

The event receiving part 108 is an example of the observed event notice information receiving part.

The inference practicing part 103, the attack activity predicting part 105, the attack occurrence determining part 106, the attack activity status information searching part 107, and the event creation setting changing part 122 are examples of an observation predicted event extracting part.

The attack activity predicting part 105 is also an example of an event stage information modifying part.

An operation according to this embodiment will be described.

When the attack detection apparatus 101 supposes based on the observed event notice information transmitted from the monitoring target apparatuses 116 and 119 that an observed event has occurred due to an attack, the attack detection apparatus 101 predicts an event that will possibly be observed next by the monitoring target apparatuses 116 and 119.

When predictions actually come true a predetermined number of times or more, the attack detection apparatus 101 concludes that an attack has occurred.

The outline of an event prediction scheme will be described hereinafter with reference to FIGS. 3, 4, and 5.

Figure 3:
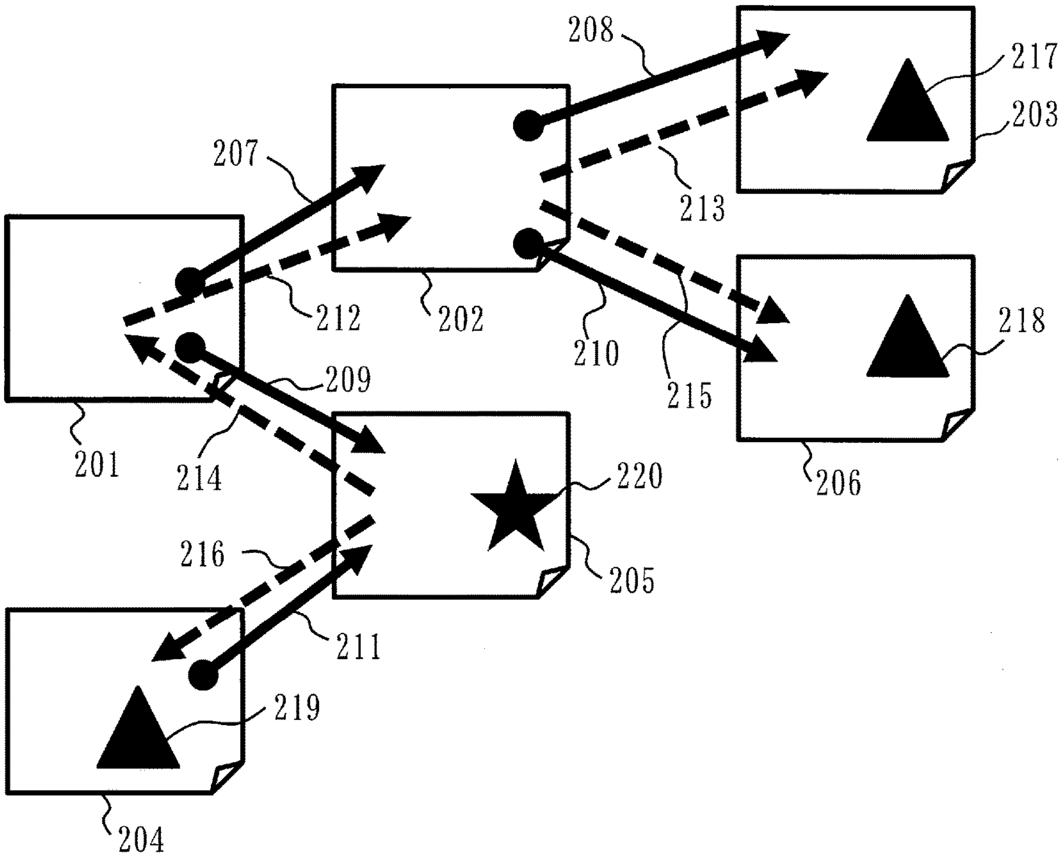
FIG. 3 is a diagram illustrating the outline of an attack prediction scheme according to Embodiment 1.

FIG. 3 is a diagram illustrating the outline of an event prediction scheme according to this embodiment.

In FIG. 3, elements 201 to 206 represent attack activity definition information.

Figure 4:
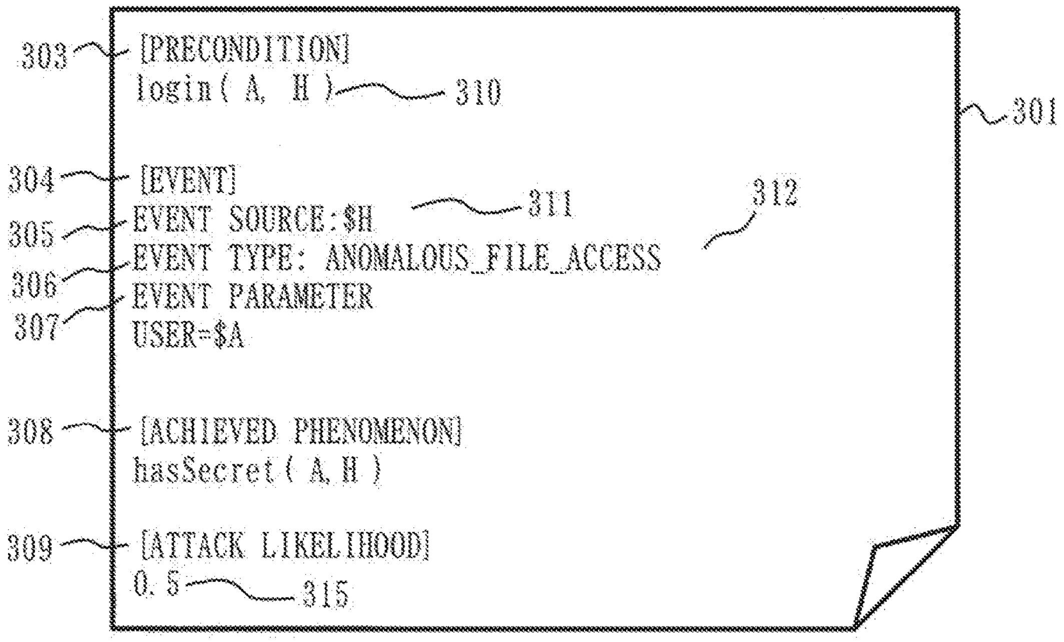
FIG. 4 is a diagram illustrating an example of attack activity definition information according to Embodiment 1.
Figure 5:
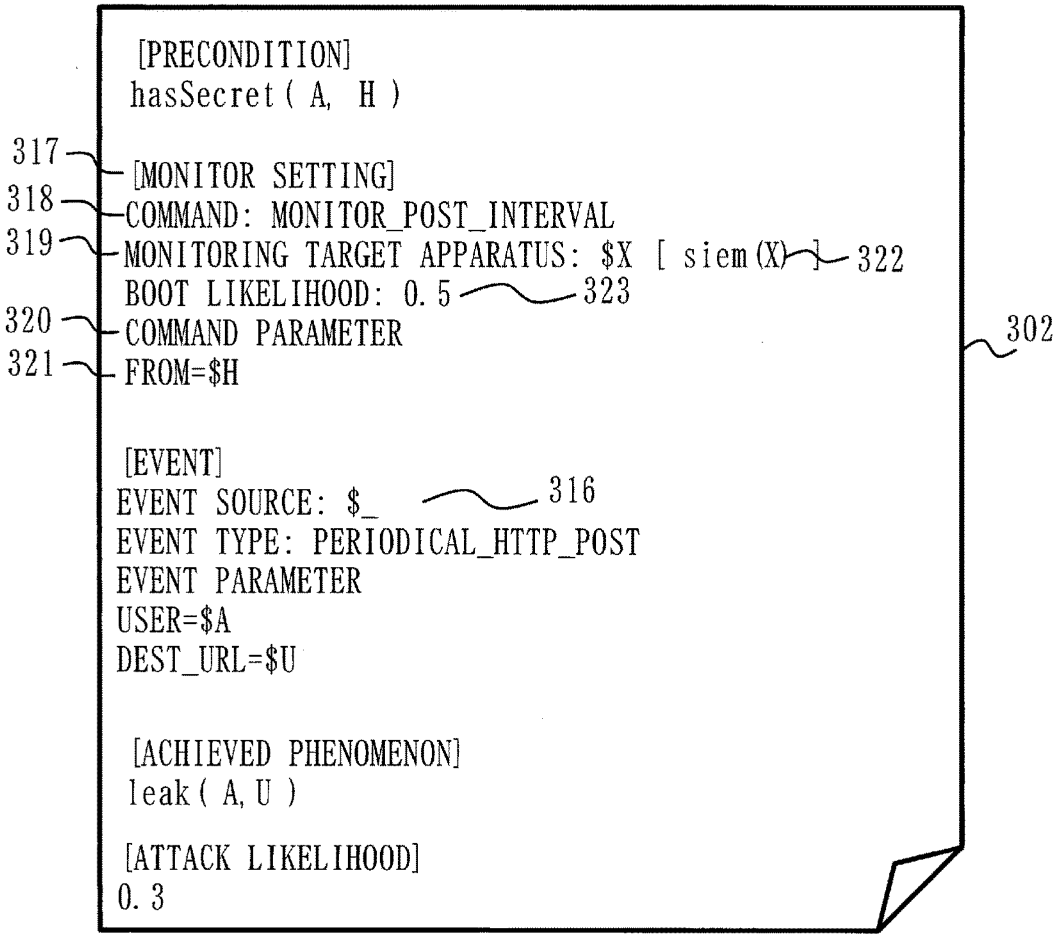
FIG. 5 is a diagram illustrating an example of attack activity definition information according to Embodiment 1.

FIGS. 4 and 5 illustrate examples of the attack activity definition information.

The attack activity definition information is composed of a precondition 303, an event 304, an achieved phenomenon 308, and an attack likelihood 309, as attack activity definition information 301 of FIG. 4 is.

The attack activity definition information may include monitor setting 317, as attack activity definition information 302 of FIG. 5 does.

The precondition 303 describes, in the form of predicate logic, a prerequisite condition for the event 304 to occur at the time of an attack.

More specifically, the precondition 303 describes a stage (pre-event stage) of a progress of attack before the event 304 is observed.

For example, predicate logic denoted by reference numeral 310 in FIG. 4 expresses a stage "A logs in to H" as a precondition.

A and H presented by reference numeral 310 are variables that are bound to specific values (such as "user001") by a value obtained from the observed event, for example.

The event 304 is an event observed by the information system when an attack against the information system is underway.

For the event 304, an event source 305, an event type 306, and an event parameter 307 are defined.

The event source 305 indicates an event source as an object of the attack activity definition information 301.

Reference numeral 311 denotes a value allowed as the source and, in this example, is associated with the predicate logic 310 by a variable H ($ at the beginning of $H indicates that H is a variable).

The event type 306 designates the type of the event as an object of the attack activity definition information 301.

An actual event type is designated like reference numeral 312.

The event parameter 307 expresses the parameter of the event.

The event parameter 307 designates a value as an object of the attack activity definition information 301.

In the example illustrated in FIG. 4, a parameter named USER is required to have the same value as a variable A indicated by reference numeral 310.

With the observed event notice information, the event source, the event type, and the event parameter are notified, as with the attack activity definition information 301 of FIG. 4.

In the attack activity definition information 301 of FIG. 4, the values of the variables of the event source 305 and the event parameter 307 are not specified. In the observed event notice information, the values of the variables of the event source and event parameter are specified.

The achieved phenomenon 308 indicates, by predicate logic, a phenomenon that the attacker achieved at the time an event corresponding to the items of reference numerals 305 to 307 of the attack activity definition information 301 has occurred.

More specifically, the achieved phenomenon 308 describes a stage (post-event stage) of a progress of attack after the event corresponding to the items of reference numerals 305 to 307 is observed.

The example of FIG. 4 indicates a stage where "a user A obtains the secret of a host H".

The attack likelihood 309 indicates the likelihood of the attack against the information system when an event corresponding to the items of reference numerals 305 to 307 of the attack activity definition information 301 occurs.

In the example of FIG. 4, the likelihood value is defined to 0.5, as indicated by reference numeral 315.

A variable indicated with one character of underscore ("_") can take any arbitrary value, as indicated by reference numeral 316 of FIG. 5.

The monitor setting 317 of FIG. 5 is composed of a command 318, a monitoring target apparatus 319, a boot likelihood 323, and a command parameter 320.

The command 318 is a command used to cause the monitoring target apparatus to change the monitor setting in order to observe the event defined by the attack activity definition information 302.

The monitoring target apparatus 319 designates a monitoring target apparatus being the transmission destination of the command.

If the monitoring target apparatus being the transmission destination of the command is expressed by a variable, a value that satisfies subsequent predicate logic (322) is selected.

The boot likelihood 323 indicates an accumulated attack likelihood (to be described later) which is a minimum requirement for changing the monitor setting.

The boot likelihood 323 is a threshold for causing the monitoring target apparatus to start a predetermined monitoring operation, and is an example of a monitoring operation start threshold.

The command parameter 320 is parameter information to be added to the command.

Actual information is designated by name=value, as indicated by reference numeral 321.

Back to FIG. 3, an attack prediction scheme according to this embodiment will be described.

FIG. 3 illustrates a status wherein an event that matches an event 220 described in attack activity definition information 205 is observed by the monitoring target apparatus 116 or 119.

When an event that matches the event 220 is observed, the attack detection apparatus 101 searches for the attack activity definition information 205 which describes the same event 220 as the observed event.

Then, the attack detection apparatus 101 searches for other attack activity definition information that depend on the achieved phenomenon described in the attack activity definition information 205 which has been searched for.

Attack activity definition information A depending on attack activity definition information B means that the precondition of the attack activity definition information A is partly or entirely satisfied by the achieved phenomenon of the attack activity definition information B.

Namely, the attack activity definition information A depending on the attack activity definition information B means that the achieved phenomenon of the attack activity definition information B is described in the attack activity definition information A, as a precondition.

In FIG. 3, such dependency is indicated by solid arrows 207 to 211.

More specifically, attack activity definition information 204 only depends on the attack activity definition information 205.

Attack activity definition information 201 depends on attack activity definition information 202 and attack activity definition information 205.

The attack activity definition information 202 depends on attack activity definition information 203 and attack activity definition information 206.

Broken arrows 212 to 216 indicate the search directions for the attack activity definition information by the attack detection apparatus 101.

After having searched for other attack activity definition information 201 and 204 which depend on the achieved phenomenon described in the attack activity definition information 205, the attack detection apparatus 101 then checks whether all preconditions are satisfied for each of the attack activity definition information 201 and 204.

In the attack activity definition information 204, there is no precondition other than the achieved phenomenon obtained by the observed event. Thus, all the preconditions are satisfied.

Then, the attack detection apparatus 101 extracts an event 219 described in the attack activity definition information 204, as one event that may occur next (observation predicted event).

In the attack activity definition information 201, there is a precondition other than the achieved phenomenon obtained by the observed event. Thus, not all the preconditions are satisfied.

The attack detection apparatus 101 searches for attack activity definition information (attack activity definition information 202 in the example of FIG. 3) that defines an achieved phenomenon satisfying an unsatisfied precondition.

Then, the attack detection apparatus 101 checks whether all the preconditions of the attack activity definition information 202 are satisfied.

In the example of FIG. 3, there are two preconditions of the attack activity definition information 202, neither of which is satisfied.

Therefore, the attack detection apparatus 101 searches for attack activity definition information (the attack activity definition information 203 and the attack activity definition information 206 in the example of FIG. 3) that define achieved phenomenon satisfying each precondition.

In this manner, the attack detection apparatus 101 searches for the attack activity definition information recursively. When attack activity definition information for which all the preconditions are satisfied is found, the attack detection apparatus 101 extracts an event defined in that attack activity definition information, as an event (observation predicted event) that may occur next (an event 217 and an event 218 are extracted in FIG. 3).

The extracted event is described in the attack activity status information to be described later, and the attack activity status information is held in the attack detection apparatus 101.

The attack activity status information will be described with reference to FIG. 6.

Figure 6:
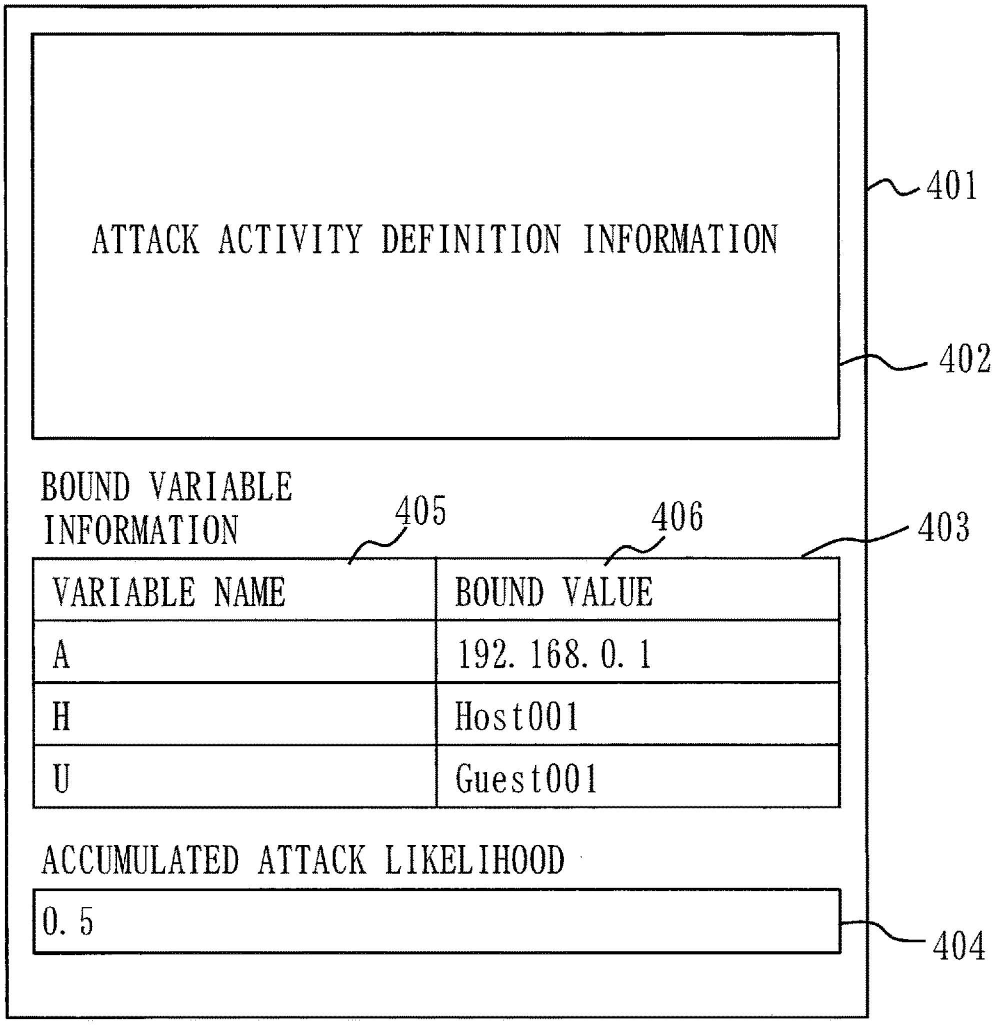
FIG. 6 is a diagram illustrating an example of attack activity status information according to Embodiment 1.

As illustrated in FIG. 6, attack activity status information 401 is composed of attack activity definition information 402, bound variable information 403, and accumulated attack likelihood 404.

The attack activity definition information 402 is the same as the attack activity definition information indicated in FIGS. 4 and 5.

The bound variable information 403 is a table that stores values (variable values) to which the variables in the attack activity definition information are bound.

The bound variable information 403 is composed of two columns that are a column of variable name 405 and a column of bound value 406.

The accumulated attack likelihood 404 stores an accumulated likelihood value as of a time point at which the attack activity status information 401 is created.

As illustrated in FIG. 6, in the attack activity status information 401, bound values (variable values) associated with the event and the accumulated likelihood value are related to the attack activity definition information 402 (event stage information).

The operation of the attack detection apparatus 101 according to this embodiment of the present invention will be described in more detail with reference to FIG. 7.

Figure 7:
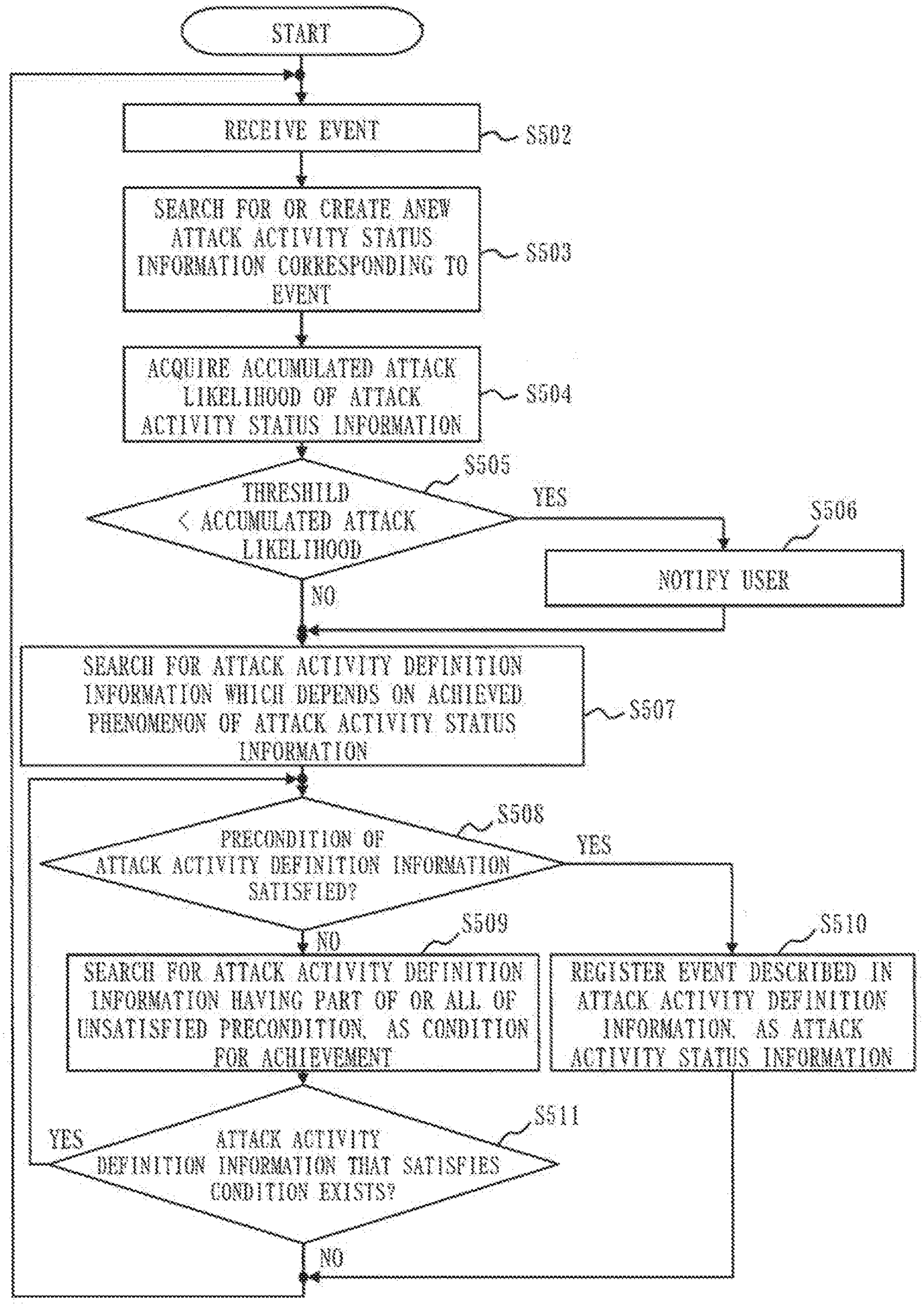
FIG. 7 is a flowchart illustrating an operation example of the attack detection apparatus according to Embodiment 1.

FIG. 7 is a flowchart illustrating the outline of the operation of the attack detection apparatus 101 according to this embodiment.

In S502, the event receiving part 108 receives the observed event notice information from the monitoring target apparatus.

As described above, in the observed event notice information, the values of the event source, event type, and event parameter are specified to correspond to the event source 305, event type 306, and event parameter 307, respectively, of the attack activity definition information 301 of FIG. 4.

Then, in S503, the attack activity status information searching part 107 searches the attack activity candidate storage part 104 for the attack activity status information 401 corresponding to the observed event (event type, event source, and event parameter) notified by the observed event notice information.

More specifically, the attack activity status information searching part 107 searches for the attack activity status information 401 in which the event type corresponding to the event type of the observed event notified by the observed event notice information is described in the field of the event type (event source 305 in FIG. 4) of the attack activity definition information 402 and in which variable values corresponding to the variable values (the variable value of the event source and the variable value of the event parameter) specifying the observed event notified by the observed event notice information are described in the bound variable information 403.

If the attack activity status information 401 corresponding to the observed event does not exist in the attack activity candidate storage part 104, the attack activity status information searching part 107 searches for attack activity definition information that describes the event type of this observed event.

Then, the attack activity status information searching part 107 creates new attack activity status information by setting to the attack activity definition information searched for, in the bound variable information 403, the variable value of the event source and the variable value of the event parameter which are notified by the observed event notice information.

In S504, the attack occurrence determining part 106 updates the value of the accumulated attack likelihood 404 by adding the value of the attack likelihood (corresponding to the attack likelihood 309 of FIG. 4) described in the attack activity definition information 402 within the attack activity status information 401, to the value of the accumulated attack likelihood 404 of the attack activity status information 401.

In S505, the attack occurrence determining part 106 compares the value of the accumulated attack likelihood 404 updated in S503 with the attack determination threshold.

If the value of the accumulated attack likelihood 404 is larger than the attack determination threshold, then in S506, the attack occurrence determining part 106 notifies the user of an occurrence of an attack via the display part 115.

The process from S507 onward constitutes a process for predicting an event that can occur next.

In S507, the attack activity status information searching part 107 obtains a phenomenon achieved by the attack activity status information 401 obtained in S503, from the achieved phenomenon and the bound variable information in the attack activity status information 401, and searches for attack activity definition information that depends on the obtained phenomenon.

In S508, the inference practicing part 103 checks whether the precondition of the attack activity definition information found by the search is already satisfied.

More specifically, the inference practicing part 103 determines for all of the preconditions of the attack activity definition information, whether or not a corresponding achieved phenomenon is registered in the achieved phenomenon database.

If all of the preconditions of the attack activity definition information are already satisfied, the event described in this attack activity definition information is the event that is predicted to be observed next.

In S510, the attack activity predicting part 105 creates attack activity status information from this attack activity definition information and registers the created attack activity status information to the attack activity candidate storage part 104.

Hence, the attack activity status information describing the event predicted to be observed next is registered to the attack activity candidate storage part 104.

More specifically, the attack activity predicting part 105 creates the new attack activity status information by relating the value of the accumulated attack likelihood 404 updated in S503 and the variable values described in the observed event notice information received in S502, to the attack activity definition information.

If any of preconditions is not satisfied, then in S509, the attack activity status information searching part 107 searches for attack activity definition information describing an achieved phenomenon that satisfies the precondition.

In S511, if it is found that such attack activity definition information does not exist, the attack activity predicting part 105 does not predict the event to be observed next.

Then, again in S502, the event receiving part 108 waits for the arrival of new observed event notice information.

In S511, if attack activity definition information describing an achieved phenomenon that satisfies the precondition is found, then again in S508, the attack activity predicting part 105 checks whether the precondition of the attack activity definition information that is found is satisfied.

S508 to S511 are repeated in this manner, thereby conducting event prediction as illustrated in FIG. 3.

Whether or not a precondition is satisfied is determined by the inference practicing part 103.

The inference practicing part 103 according to this embodiment determines whether or not a precondition is satisfied, based on information described in the form of predicate logic in the achieved phenomenon database 109, the inference rule database 110, and the configuration information database 112.

The achieved phenomenon database 109 stores predicate logic expressing an achieved phenomenon, as indicated by reference numeral 601 in FIG. 8.

For example, reference numeral 602 denotes a phenomenon that a user "alice" logs in to a host "host001".

Likewise, the configuration information database 112 stores, in the form of predicate logic, information concerning the configuration of the information system.

The inference rule database 110 records an inference rule that always holds.

The inference rule database 110 is composed of two columns that are a column of goal 702 and a column of condition 703, as indicated by reference numeral 701 of FIG. 9.

In the goal 702, what is satisfied when the condition 703 is satisfied is defined.

Both the goal 702 and the condition 703 are defined using predicate logic.

Reference numerals 704 and 705 indicate examples of information stored in the inference rule database 110.

This example indicates that if the group having the reading right for a file F is a group G and if a user U belongs to the group G (705), the user U can read the file F (704).

The processes illustrated in FIG. 7 will be described in more detail.

First, S503 of FIG. 7 will be described in detail with reference to the flowcharts illustrated in FIGS. 10 to 13.

The processes of FIGS. 10 to 13 are executed by the attack activity status information searching part 107.

First, the attack activity status information searching part 107 stores the observed event (event type, event source, and event parameter) notified by the received observed event notice information, to variable E (S802).

Then, in S803, the attack activity status information searching part 107 acquires a list of attack activity status information stored in the attack activity candidate storage part 104.

In S804, the attack activity status information searching part 107 calls a search subroutine (to be described later) and searches for attack activity status information corresponding to the observed event.

The search result of the search subroutine consists of two sets.

One set is the existing attack activity status information 401 that hits by the search. In S804, the existing attack activity status information 401 is stored in a variable Hit.

The other set is a duplicate of the attack activity status information 401 included in the variable Hit. This duplicate is an update of the bound variable information 403 included in the attack activity status information 401, by the contents included in the observed event.

The precondition of the attack activity status information 401 included in Hit is already satisfied. Hence, in S805, the attack activity status information 401 is deleted from the attack activity candidate storage part 104.

If the monitor setting 317 is defined in the attack activity definition information 402 in the attack activity status information 401, the attack activity status information searching part 107 transmits, via the event creation setting changing part 122, cancelation of the monitor setting 317 to the monitoring target apparatus for which a monitor command is set.

Then, in S806, the attack activity status information searching part 107 loads the list of attack activity definition information stored in the attack activity definition information database 111.

In S807, the attack activity status information searching part 107 initializes a set CL.

S808 and S812 indicate a loop.

S808 indicates that the process in the loop is carried out for all attack activity definition information that are loaded.

Each time the loop is carried out, attack activity definition information is assigned to a variable D.

In S809 and S810, the attack activity status information searching part 107 creates new attack activity status information using the variable D as a template.

In S811, the new attack activity status information created is stored in the set CL initialized in S807.

In S813, the search subroutine is called, and attack activity status information corresponding to the received observed event is searched for from among the attack activity status information in the set CL created in the above manner.

However, the searched attack activity status information may include one that does not satisfy the precondition. Hence, in S814, the attack activity status information searching part 107 calls a precondition unsatisfied information delete process (to be described later).

Then, the attack activity status information searching part 107 assigns a result obtained by removing the attack activity status information not satisfying the precondition from the attack activity status information that hits the search, to a set Ret2 again.

Finally, the attack activity status information searching part 107 computes a sum-set of the set Ret obtained in S804 and the set Ret2 obtained in S814 and returns the sum-set to the caller (S815).

The process of the search subroutine (S804 and S813 of FIG. 10) will be described with reference to FIGS. 11 and 12.

Figure 11:
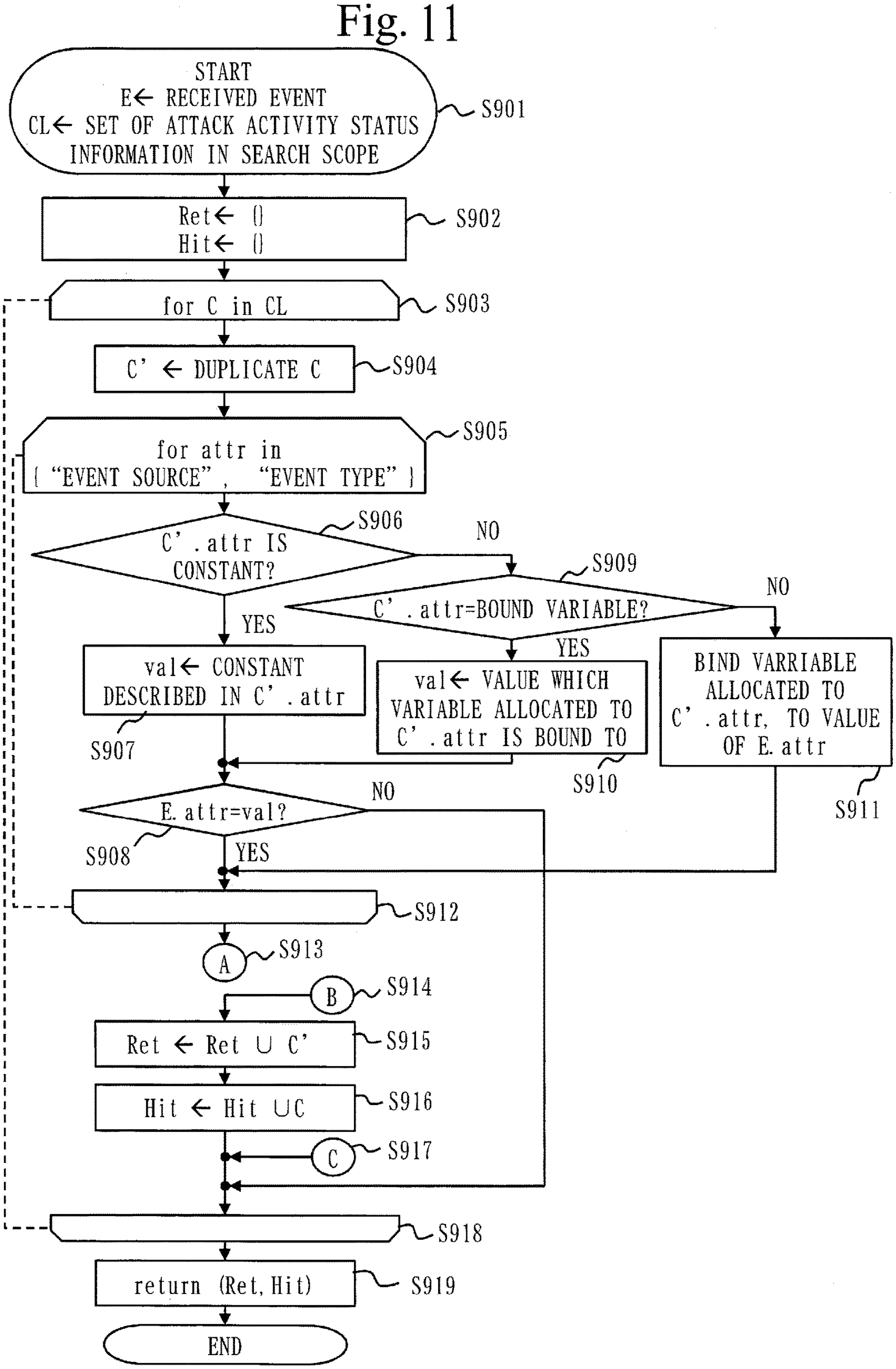
FIG. 11 is a flowchart illustrating in detail a search subroutine according to Embodiment 1.
Figure 12:
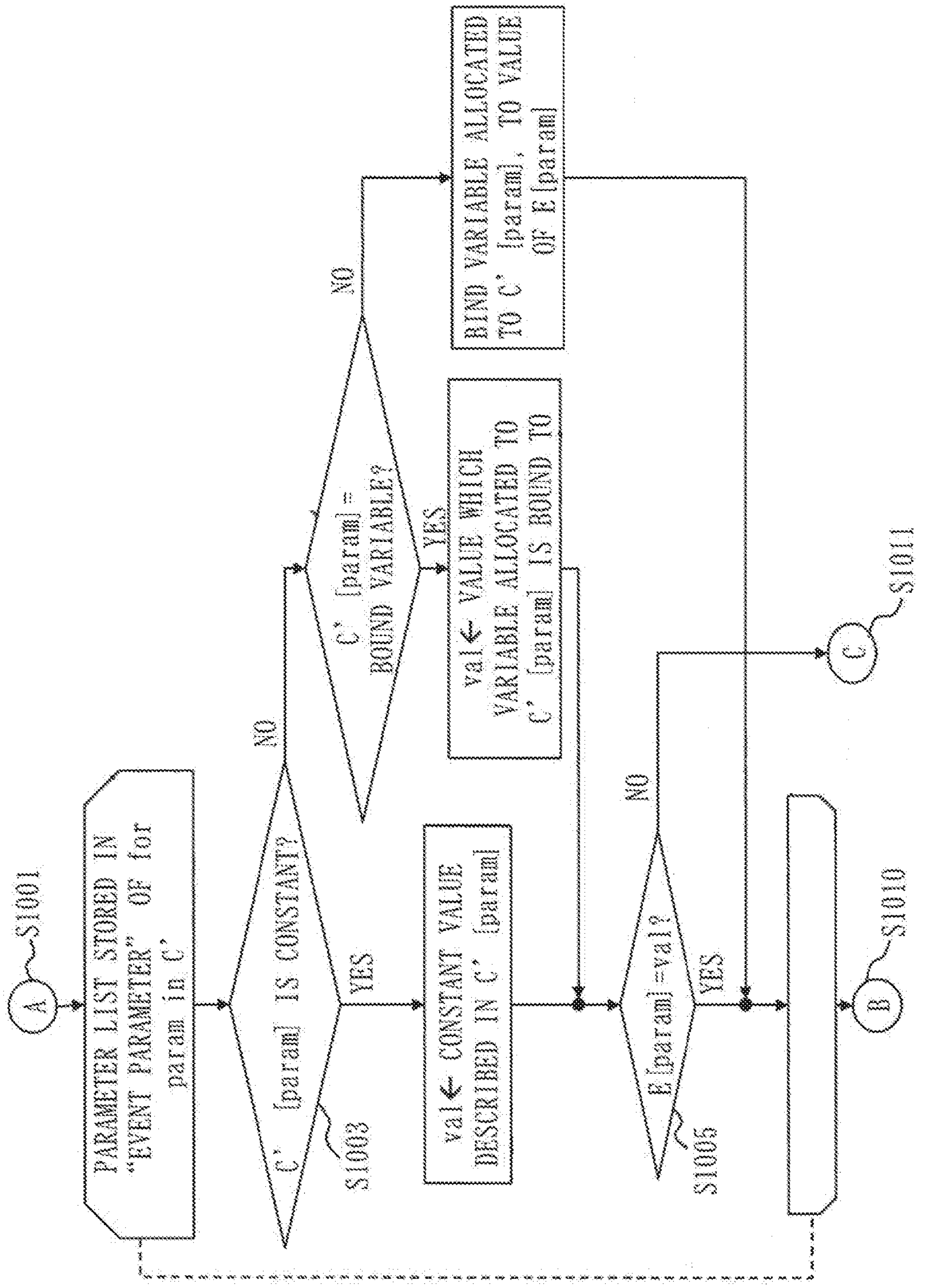
FIG. 12 is a flowchart illustrating in detail the search subroutine according to Embodiment 1.

FIGS. 11 and 12 illustrate flowcharts indicating the search subroutines in detail.

The search subroutines of FIGS. 11 and 12 are executed by a search subroutine executing part (not illustrated in FIG. 2) being an internal element of the attack activity status information searching part 107.

First, in S901, the search subroutine executing part receives an observed event E and the set CL of the attack activity status information of the search range, which are received as arguments.

In S902, variables that store return values are initialized. In the loop beginning with S903, whether each piece of attack activity status information C in the set CL corresponds to the observed event E is checked.

In the loop, first in step S904, the search subroutine executing part duplicates the attack activity status information C as the checking target and stores the duplicated attack activity status information C to a variable C'.

The loop beginning with S905 indicates that the elements of a set {"event source", "event type"} are assigned to a loop variable attr.

In S906, if the value of an element corresponding to attr defined in the attack activity definition information in the attack activity status information C' being the checking target is a constant, the process branches to S907, and a constant value is assigned to a variable val.

If the value of the element corresponding to attr is not a constant, the process branches to S909, and the search subroutine executing part checks whether a variable referred to as the value of this element is bound, by referring to the bound variable information in the attack activity status information C' being the checking target.

If the variable is bound, the process branches to S910, and the value to which this variable is bound is assigned to the variable val.

If the variable is not bound yet, the process branches to S911. The search subroutine executing part updates the bound variable information in the attack activity status information C' being the checking target so that this variable is bound to a corresponding value of the observed event E.

If, as in S907 and S910, some value is already allocated to this variable, then in S908, the search subroutine executing part compares the allocated value and the corresponding value of the observed event to check whether they are identical.

If they are not identical (NO in S908), the search subroutine executing part determines that the attack activity status information C' being the checking target does not correspond to the observed event E. Then, via S918, the process goes to checking of the next attack activity status information.

In S908, if the search subroutine executing part confirms that the event source and event type of the attack activity status information C' being the checking target are identical to the event source and event type of the observed event E (YES in S908), the process goes to S1001 of FIG. 12 via (A) of S913.

In FIG. 12, it is checked whether the event parameter included in the attack activity definition information in the attack activity status information C' being the checking target corresponds to the event parameter of the observed event E.

The process flow is almost the same as the description in S905 through S912 except for the fact that the comparison target is an event parameter.

The representation of parenthesis ("[", "]") employed in S1003, S1005, and the like signifies an operation of extracting an event parameter indicated by the variable in the parentheses from the variable located on the left side of the parenthesis.

If it is confirmed that the event parameter of the attack activity status information C' being the checking target and the event parameter of the observed event E are identical, the process returns to S914 of FIG. 11 via (B) of S1010.

If the search subroutine executing part confirms that the event parameter of the attack activity status information C' being the checking target and the event parameter of the observed event E are not identical, the process returns to S917 of FIG. 11 via (C) of S1011.

When the process reaches S915 of FIG. 11, the attack activity status information C' being the checking target is regarded to correspond to the observed event E. In S915 and S916, the attack activity status information C' being the checking target is stored to the set which becomes the return values.

When the checking ends for all attack activity status information, then in S919, the search subroutine executing part returns the return value set to the caller, and ends the process.

A precondition unsatisfied information delete process (S814 of FIG. 10) will be described with reference to FIG. 13.

Figure 13:
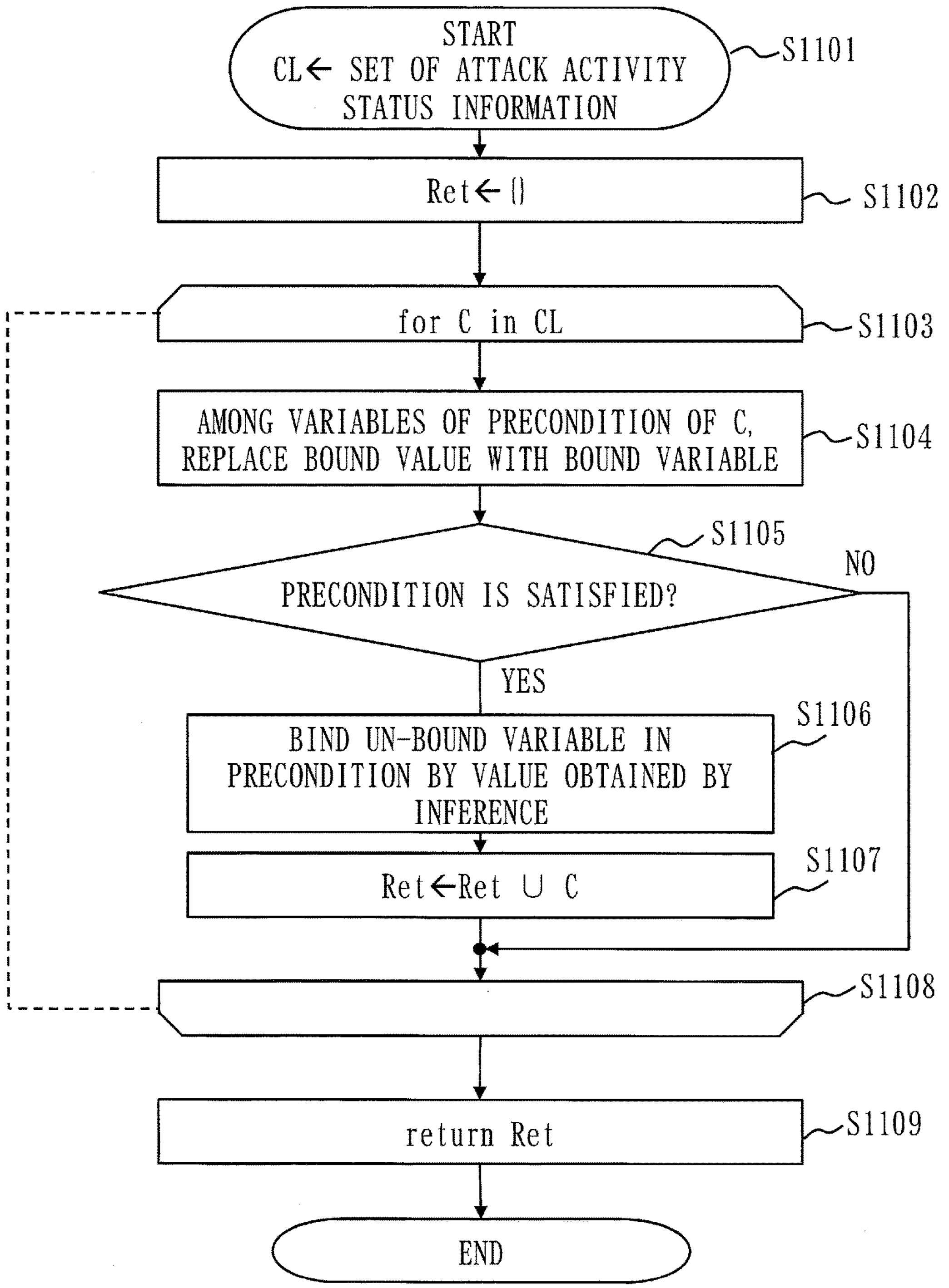
FIG. 13 is a flowchart illustrating in detail a precondition unsatisfied information delete process according to Embodiment 1.

FIG. 13 is a flowchart illustrating the precondition unsatisfied information delete process in detail.

The precondition unsatisfied information delete process of FIG. 13 is carried out by a precondition unsatisfied information delete processing part (not shown in FIG. 2) being an internal element of the attack activity status information searching part 107.

The precondition unsatisfied information delete processing part is called in S1101 with the set CL of the attack activity status information being the investigation target, as an argument.

In S1102, the variable being a return value is initialized. In a loop beginning with S1103, it is checked whether a precondition is satisfied for each piece of attack activity status information within the set C of the attack activity status information.

In S1104, the precondition unsatisfied information delete processing part extracts the precondition from the attack activity definition information of the attack activity status information C being the checking target.

If a value is registered in the bound variable information of the attack activity status information C, the precondition unsatisfied information delete processing part replaces a variable in the precondition with the registered value.

Then, in S1105, the inference practicing part 103 is called. The inference practicing part 103 checks whether a precondition formula is satisfied.

If the precondition is not satisfied, the process branches to S1108, and the process goes to checking of the next attack activity status information.

If the precondition is satisfied, the inference practicing part 103 returns a specific value for an un-bound variable in the precondition, to the precondition unsatisfied information delete processing part.

Then, in S1106, the precondition unsatisfied information delete processing part updates the bound variable information of the attack activity status information C so that the un-bound variable is bound to a value obtained from the inference practicing part 103.

After that, in S1107, the precondition unsatisfied information delete processing part registers the attack activity status information C to the return value variable. Via S1108, the process goes to checking of the next attack activity status information.

When checking for all attack activity status information in the set CL of the attack activity status information ends, then in S1109, the precondition unsatisfied information delete processing part returns the set of the attack activity status information stored in the return value variable, to the caller, and ends the process.

The process of S504 and S505 of FIG. 7 will be described in detail with reference to the flowchart of FIG. 14.

Figure 14:
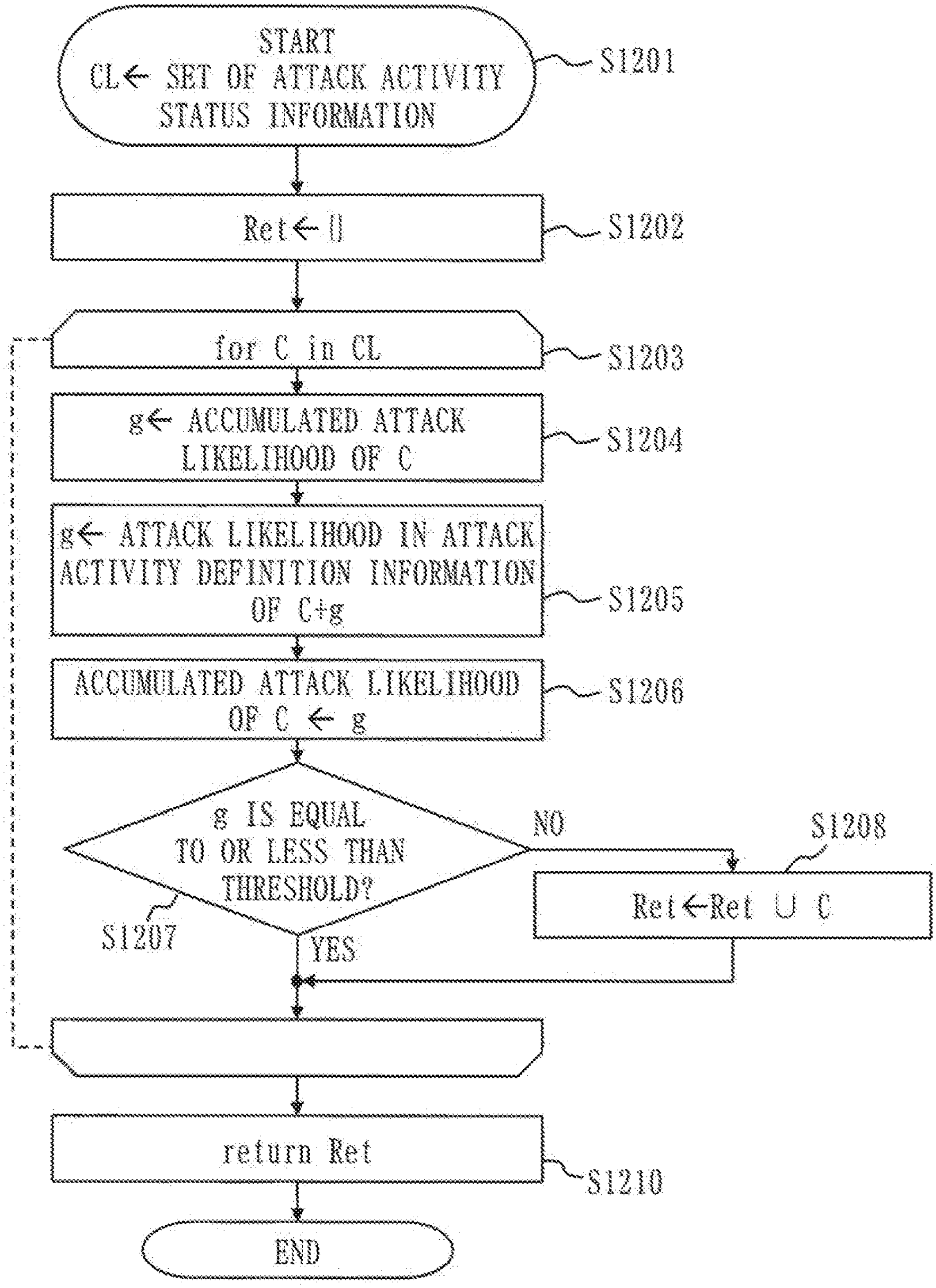
FIG. 14 is a flowchart illustrating in detail an attack occurrence determination process according to Embodiment 1.

The process of FIG. 14 is executed by the attack occurrence determining part 106.

In S1201, the attack occurrence determining part 106 is called with the set CL of the attack activity status information obtained by the attack activity status information searching part 107, as an argument.

In S1202, the attack occurrence determining part 106 initializes the return value variable Ret which stores attack activity status information with which it is determined that an attack is underway. Then, in a loop beginning with S1203, the attack occurrence determining part 106 carries out an attack determination for each piece of attack activity status information in the set CL of the attack activity status information.

First, in S1204, S1205 and S1206, the attack occurrence determining part 106 adds an attack likelihood value defined in the attack activity definition information of the attack activity status information C, to the accumulated attack likelihood value of the attack activity status information C being a target.

Then, in S1207, the attack occurrence determining part 106 compares g being the addition result, with the attack determination threshold defined in advance.

If the addition result g exceeds the attack determination threshold, the process branches to S1208. The attack occurrence determining part 106 stores the attack activity status information C to the return value variable Ret.

When determination for all attack activity status information in the set CL of the attack activity status information ends, then in S1210, the attack occurrence determining part 106 returns the return value variable Ret to the caller, and ends the process.

In S506 of FIG. 7, the attack activity status information with which it is determined by the process of FIG. 14 that an attack is underway is notified to the user.

The process from S507 onward of FIG. 7, that is, the process of predicting an event to be observed next will be described in detail with reference to FIGS. 15 to 19.

Note that the process from S507 onward is practiced for each piece of attack activity status information included in the set of attack activity status information corresponding to the observed event obtained in S503, individually.

First, the achieved phenomenon is registered to the achieved phenomenon database 109 by the achieved phenomenon calculating/registering part 102.

Figure 15:
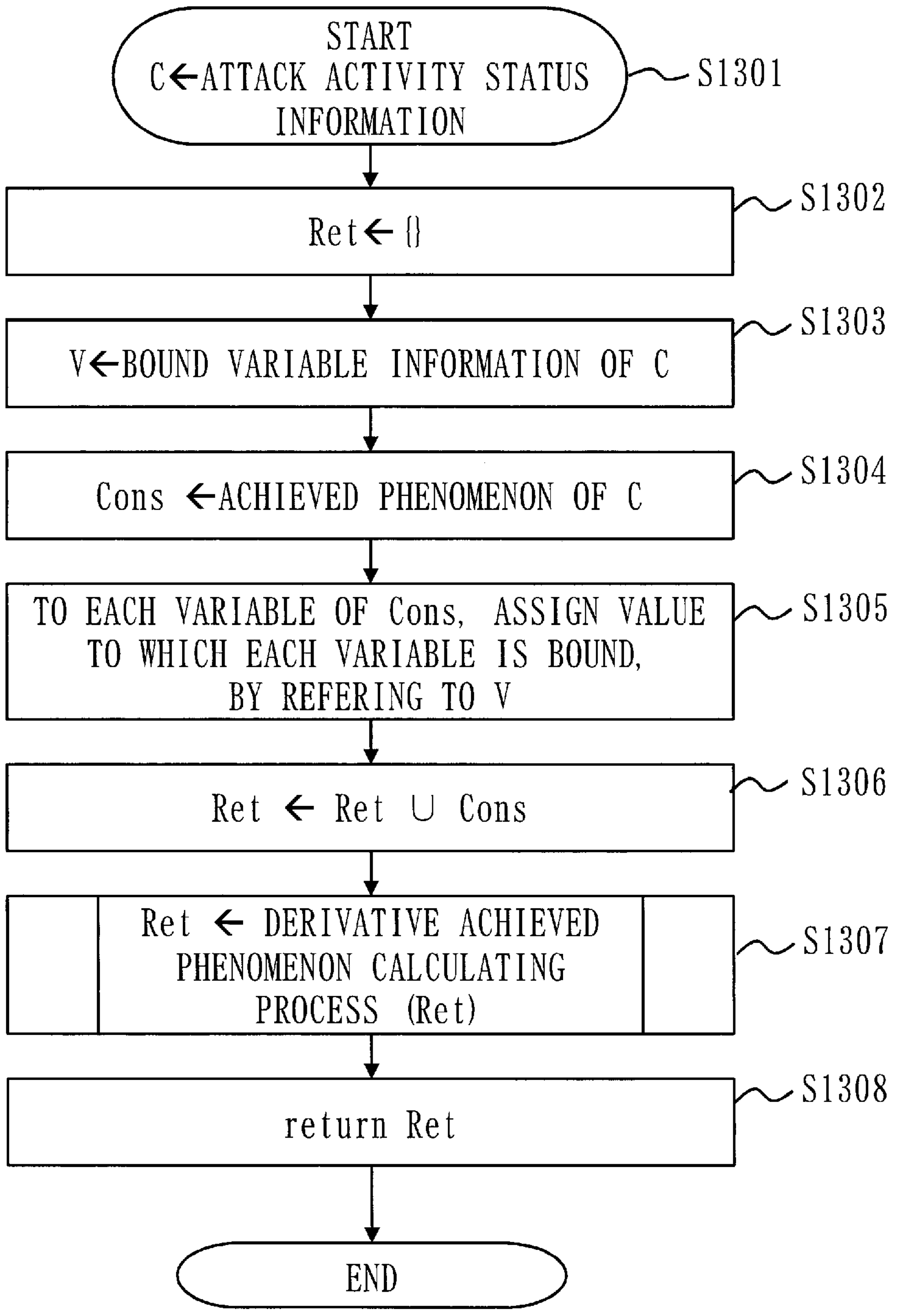
FIG. 15 is a flowchart illustrating in detail an achieved phenomenon calculation/registration process according to Embodiment 1.

FIG. 15 is a flowchart illustrating an operation example of the achieved phenomenon calculating/registering part 102.

In S1301, the achieved phenomenon calculating/registering part 102 is called with the attack activity status information C being an update target of the achieved phenomenon, as an argument.

In S1302, the achieved phenomenon calculating/registering part 102 initializes the variable Ret serving to return the achieved phenomenon to the caller.

In S1303, the achieved phenomenon calculating/registering part 102 extracts the contents of the bound variable information of the attack activity status information C.

In S1304, the achieved phenomenon calculating/registering part 102 extracts the achieved phenomenon defined by the attack activity definition information in the attack activity status information C.

Furthermore, in S1305, the achieved phenomenon calculating/registering part 102 assigns, to the variables referred to by the extracted achieved phenomenon, values to which the variables are bound.

In S1306, the achieved phenomenon calculating/registering part 102 assigns the assignment result to the return value variable Ret.

In S1307, the achieved phenomenon calculating/registering part 102 calls a derivative achieved phenomenon calculation process.

An achieved phenomenon obtained by the derivative achieved phenomenon calculation process through the inference rule is added to the return value variable Ret. In S1308, the return value variable Ret is returned to the caller. Then, the process ends.

The derivative achieved phenomenon calculation process (S1307 of FIG. 15) will be described with reference to FIG. 16.

Figure 16:
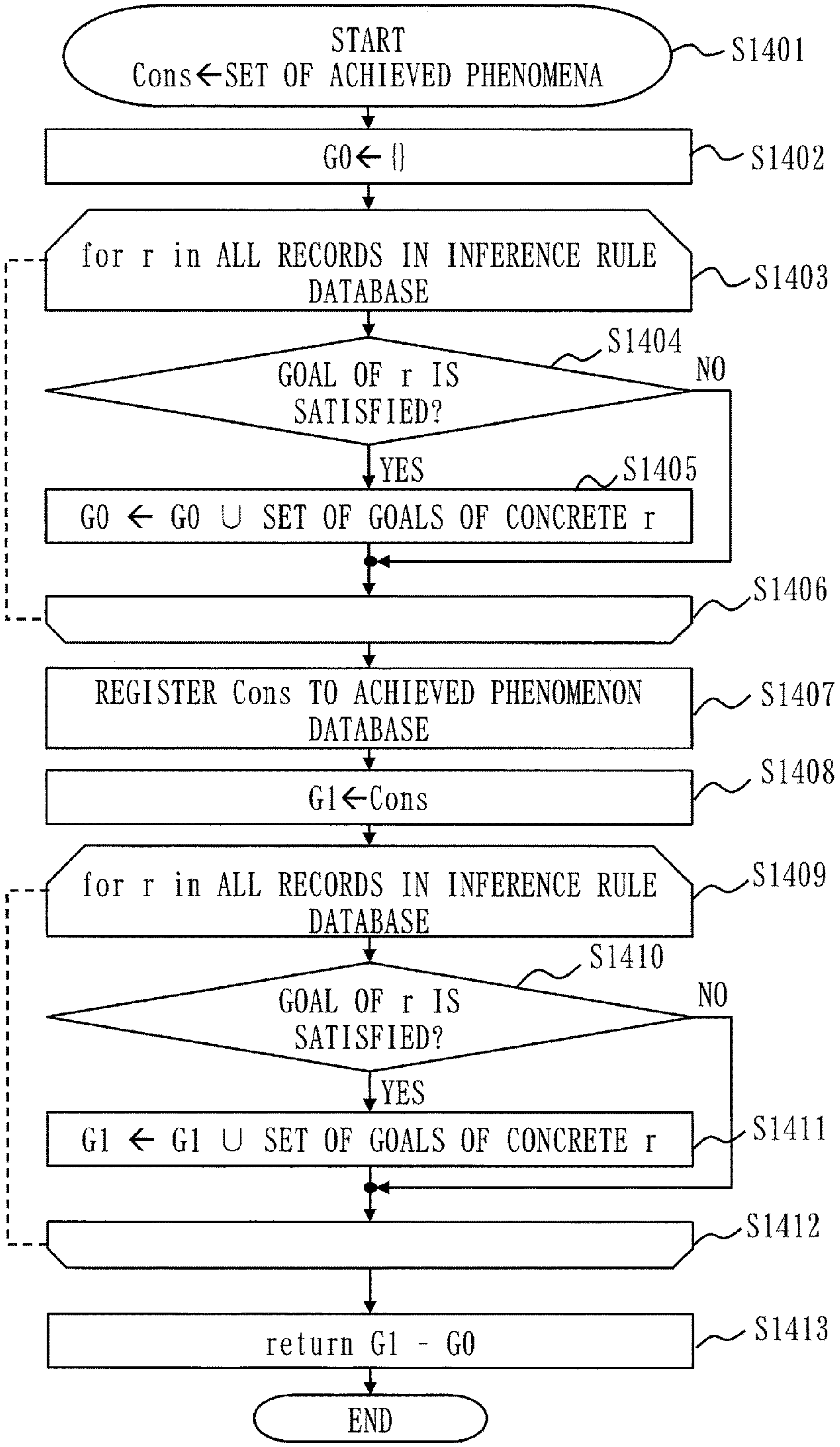
FIG. 16 is a flowchart illustrating in detail a derivative achieved phenomenon calculation process according to Embodiment 1.

FIG. 16 is a flowchart illustrating the derivative achieved phenomenon calculation process in detail.

The derivative achieved phenomenon calculation process of FIG. 16 is carried out by a derivative achieved phenomenon calculation processing part (not illustrated in FIG. 2) being an internal element of the achieved phenomenon calculating/registering part 102.

In S1401, the derivative achieved phenomenon calculation processing part is called with an achieved phenomenon set Cons, as an argument.

First, in S1402 to S1406, the derivative achieved phenomenon calculation processing part obtains an achieved phenomenon that has already been satisfied since before the achieved phenomenon given as the argument is satisfied. In S1407 to S1412, the derivative achieved phenomenon calculation processing part obtains a phenomenon that has been satisfied after the achieved phenomenon given as the argument is satisfied. The derivative achieved phenomenon calculation processing part obtains the difference between the achieved phenomenon obtained in S1402 to S1406 and the achieved phenomenon obtained in S1407 to S1412.

Hence, the derivative achieved phenomenon calculation processing part obtains an achieved phenomenon that has been achieved anew, from the achieved phenomenon set given as the argument.

In S1402, the derivative achieved phenomenon calculation processing part initializes a variable G0 which stores the set of the already satisfied achieved phenomena.

In a loop beginning with S1403, the derivative achieved phenomenon calculation processing part checks whether the goal included in each record of the inference rule database 110 is satisfied (S1404).

If the goal is already satisfied, the process branches to S1405. The derivative achieved phenomenon calculation processing part stores a set of predicates in which all the variables of the satisfied goals are replaced by specific values, to the variable G0.

Then, in S1407, the derivative achieved phenomenon calculation processing part registers the achieved phenomenon set given as the argument, to the achieved phenomenon database 109.

Hence, the inference practicing part 103 can involve the newly achieved phenomenon in inferencing.

Then, in S1408, the derivative achieved phenomenon calculation processing part stores the achieved phenomenon obtained after registration of the achieved phenomenon, to a variable G1 which stores the achieved phenomenon obtained after registration of the achieved phenomenon.

In a loop beginning with S1409, the derivative achieved phenomenon calculation processing part checks whether the goal included in each record of the inference rule database 110 is satisfied (S1410).

In S1411, the derivative achieved phenomenon calculation processing part stores the set of predicates in which all the variables of the satisfied goals are replaced by specific values, to the variable G1.

Finally, in S1413, the derivative achieved phenomenon calculation processing part calculates the difference between the variable G1 and the variable G0 and obtains the predicate of the achieved phenomenon satisfied after Cons registration. The derivative achieved phenomenon calculation processing part returns the predicate of the achieved phenomenon satisfied after the registration of the achieved phenomenon set Cons, to the caller, and ends the process.

After the achieved phenomenon is acquired in accordance with the procedure illustrated in FIG. 15, the attack activity predicting part 105 is called, and an event that can be observed next is predicted.

The operation of the attack activity predicting part 105 will be described with reference to FIGS. 17, 18, and 19.

Figure 17:
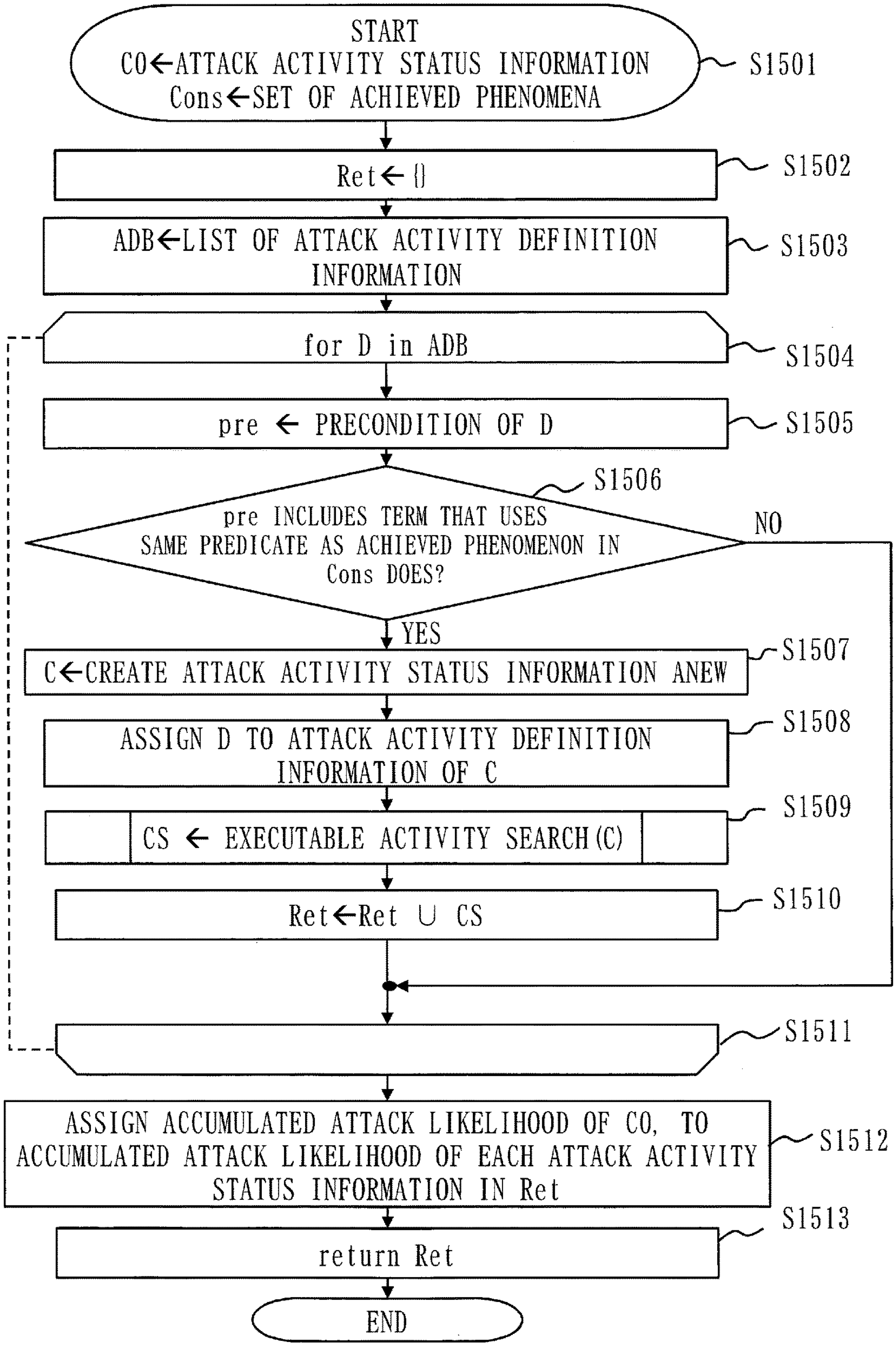
FIG. 17 is a flowchart illustrating in detail an attack activity predict process according to Embodiment 1.

FIG. 17 is a flowchart illustrating the process of the attack activity predicting part 105.

In S1501, the attack activity predicting part 105 is called with the attack activity status information CO being a prediction target, and the achieved phenomenon set Cons returned from the achieved phenomenon calculating/registering part 102, as arguments.

In S1502, the attack activity predicting part 105 initializes the predicted attack activity status information Ret. In S1503, the attack activity predicting part 105 extracts all attack activity definition information from the attack activity definition information database 111.

In a loop beginning with S1504, the attack activity predicting part 105 extracts each attack activity definition information and creates attack activity status information which indicates an event predicted to be observed next.

First, in S1505, the attack activity predicting part 105 extracts the precondition of the attack activity definition information D.

Then, in S1506, the attack activity predicting part 105 checks whether a term that uses the same predicate as that of the achieved phenomenon given as the argument exists in the precondition extracted in S1505.

If a corresponding term exists, the attack activity predicting part 105 concludes that the attack activity definition information D is attack activity definition information which depends on the achieved phenomenon. The process branches to S1507.

In S1507 and 1508, the attack activity predicting part 105 creates the attack activity status information C including the attack activity definition information D.

In S1509, the attack activity predicting part 105 is called by an executable activity search process (to be described later).

By the executable activity search process, attack activity definition information currently satisfying a present precondition is searched for from among the attack activity status information on which the attack activity status information C depends. The attack activity predicting part 105 obtains a set of attack activity status information that include the searched attack activity definition information.

In S1510, the attack activity predicting part 105 adds the set of an attack activity status information obtained by the executable activity search process, to the return value variable Ret.

In S1511, the attack activity predicting part 105 carries out the same process for the next attack activity definition information.

When the loop ends for all attack activity definition information, then in S1512, the attack activity predicting part 105 assigns the accumulated attack likelihood value stored in the argument C0, to the accumulated attack likelihood value of each attack activity status information registered in the return value variable Ret.

Then in S1513, the attack activity predicting part 105 returns the return value variable Ret to the caller, and ends the process.

The executable activity search process (S1509 of FIG. 17) will be described in detail with reference to FIGS. 18 and 19.

Figure 18:
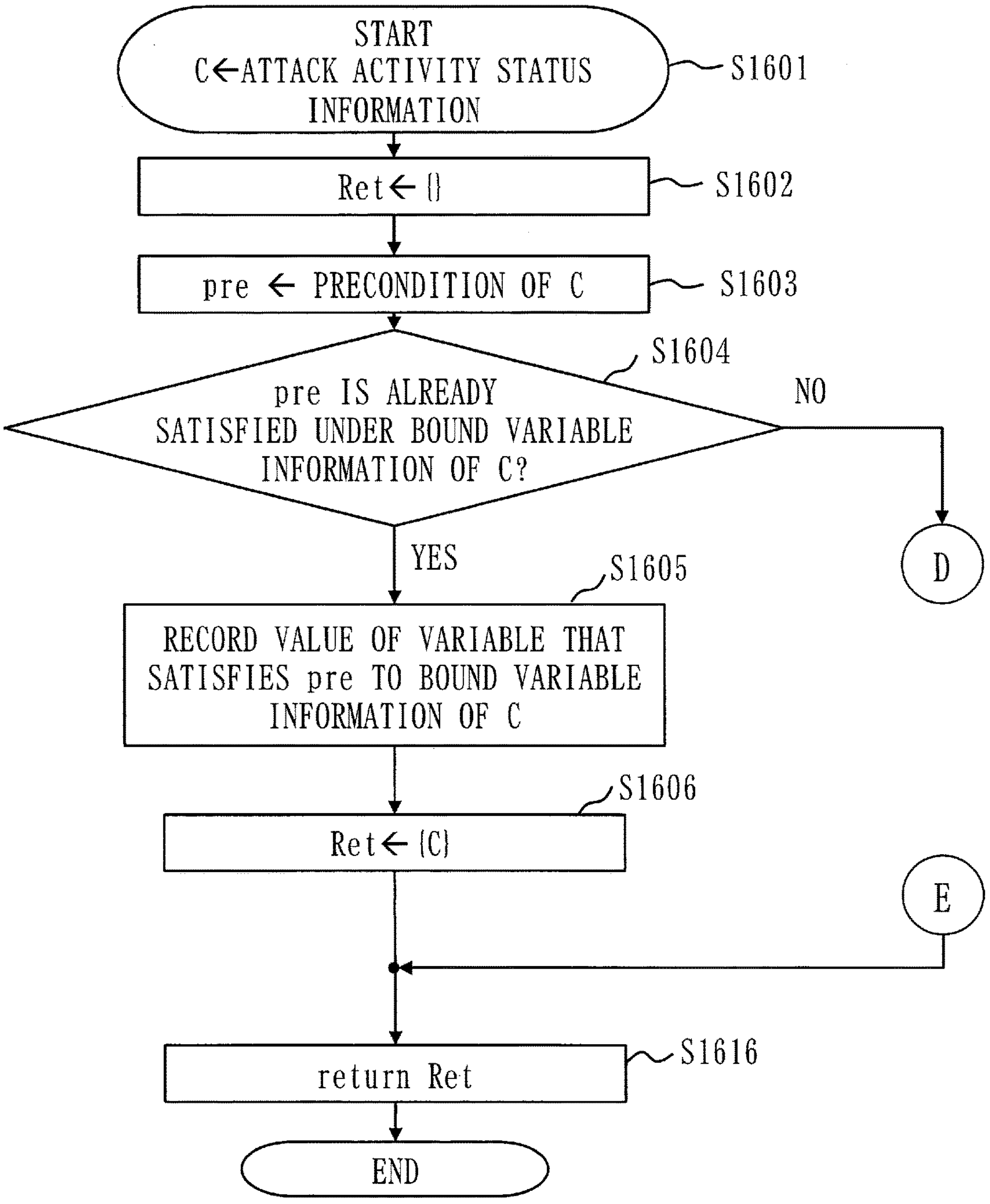
FIG. 18 is a flowchart illustrating in detail an executable activity search process according to Embodiment 1.
Figure 19:
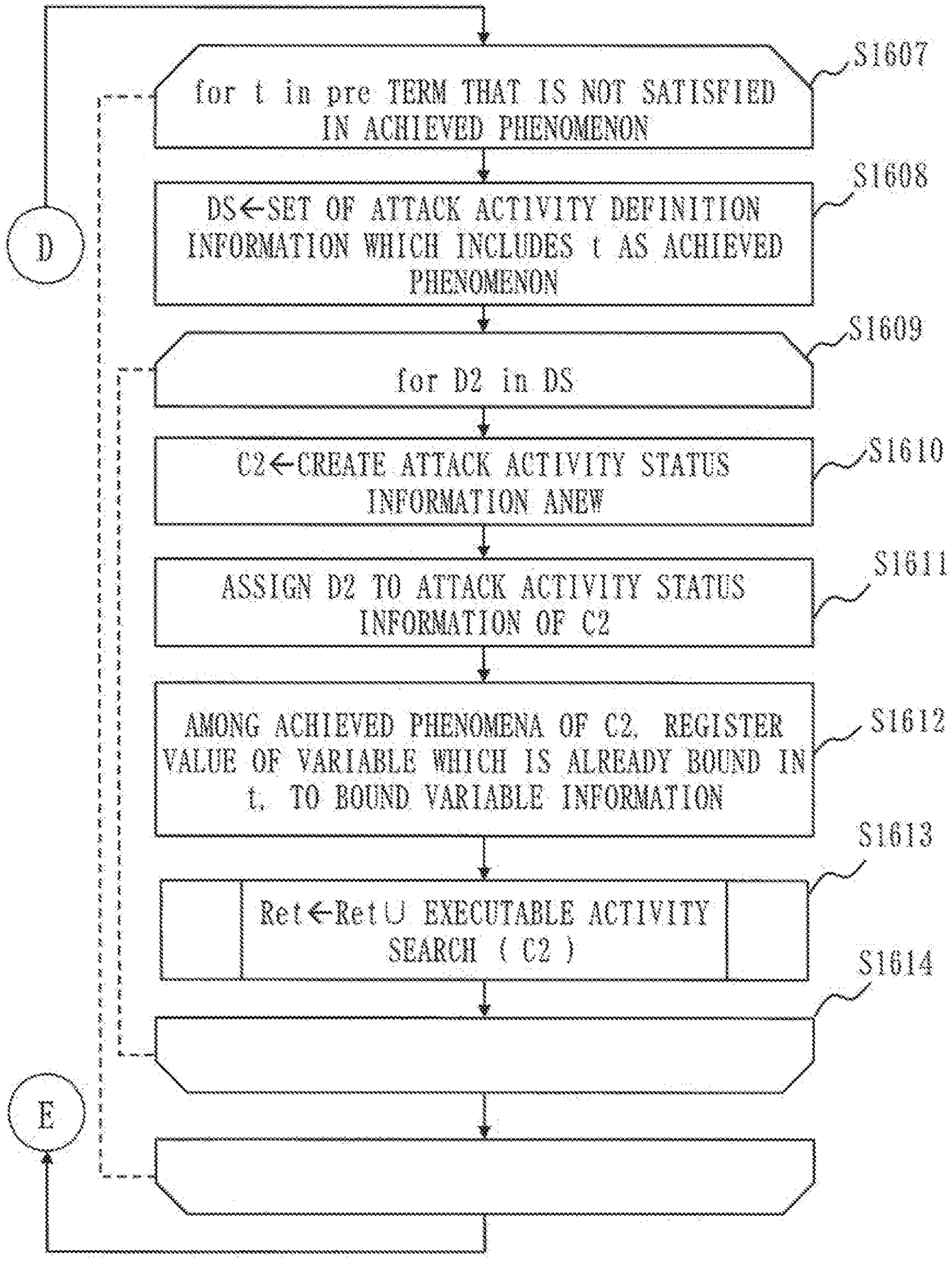
FIG. 19 is a flowchart illustrating in detail the executable activity search process according to Embodiment 1.

FIGS. 18 and 19 are flowcharts illustrating the contents of the executable activity search process.

The executable activity search process of FIGS. 18 and 19 is carried out by an executable activity search processing part (not shown in FIG. 2) being an internal element of the attack activity predicting part 105.

In S1601, the executable activity search process is started with the attack activity status information C being the start point of the search for the attack activity definition information, as the argument.

The executable activity search processing part initializes the return value variable in S1602, and in S1603, extracts the precondition of the attack activity status information C.

Then, the executable activity search processing part stores the attack activity status information C to the return value variable Ret (S1606). In S1616, the return value variable Ret is returned to the caller, and the process of the executable activity search processing part ends.

If the precondition is already satisfied, the process branches to S1605. The executable activity search processing part records the specific value (the specific value returned by the inference practicing part 103) of the unbound variable in the precondition, to the bound variable information of the attack activity status information C.

Then, the executable activity search processing part stores the attack activity status information C to the return value variable Ret. In S1616, the return value variable Ret is returned to the caller, and the process of the executable activity search processing part ends.

If the precondition is not satisfied in S1604 (NO in S1604), the process branches to S1607 via a terminal (D).

In a loop beginning with S1607, the inference practicing part 103 tests whether each term included in the precondition (the variables are bound) of the attack activity status information C can be satisfied by the achieved phenomenon in the achieved phenomenon database 109. A term t not satisfied by the achieved phenomenon in the achieved phenomenon database 109 is processed.

In S1608, the executable activity search processing part searches the attack activity definition information database 111 and obtains a set of attack activity definition information D2 that may include the term t as the achieved phenomenon.

Then, in a loop beginning with S1609, the executable activity search processing part creates, for each piece of obtained attack activity definition information D2, attack activity status information that includes the attack activity definition information D2, in S1610 and S1611.

In S1612, the executable activity search processing part registers an already bound variable of the term indicated by t, out of the achieved phenomena of the attack activity status information C2, to the bound variable information of the attack activity status information C2.

With the thus-obtained attack activity status information C2 as the argument, in S1613, the executable activity search processing part calls the executable activity search processing part itself, recursively.

Then, the executable activity search processing part adds the obtained result to the return value variable Ret. In S1614, back to the beginning of the loop, the executable activity search processing part carries out the same process for the next attack activity definition information.

Finally, when the process ends for all terms t, S1616 is executed to return the value variable Ret to the caller. Then, the process of the executable activity search processing part ends.

The attack activity status information extracted by the above process is registered to the attack activity candidate storage part 104.

If attack activity status information including the monitor setting 317 exists in the extracted attack activity status information, the event creation setting changing part 122 checks whether the accumulated attack likelihood value of the attack activity status information is higher than the boot likelihood 323 of the monitor setting 317.

If the accumulated attack likelihood value of the attack activity status information is higher than the boot likelihood 323, the event creation setting changing part 122 selects a monitoring target apparatus according to the contents of the monitoring target apparatus 319, and transmits the contents of the command 318 and command parameter 320 of the monitor setting to the selected monitoring target apparatus.

If the accumulated attack likelihood value is equal to or less than the boot likelihood 323, this attack activity status information is not registered to the attack activity candidate storage part 104.

As described above, the attack detection apparatus according to this embodiment has: the attack activity status information searching part which, using the attack activity definition information that defines the precondition and the achieved phenomenon by predicate logic, when the event is observed, searches for the attack activity definition information corresponding to the event observed, from the attack activity definition information database; and the attack activity predicting part which, using the inference practicing part, predicts a candidate of an event to be observed next, from the precondition and the achieved phenomenon in the attack activity definition information obtained from the search result.

An effect is obtained that because of the attack activity status information searching part and the attack activity predicting part, an attack that is practiced through a plurality of steps can be detected without defining all attack scenarios in advance.

Another effect is obtained that when a new monitoring target apparatus is added or a new attack technique becomes available, the attack activity definition information editing part can cope with addition of the monitoring target apparatus and the new attack technique only by adding corresponding attack activity definition information.

According to this embodiment, monitor setting is defined in the attack activity definition information. Only when an attack activity is predicted, monitoring is carried out by changing the setting of the monitoring target apparatus to necessary setting via the event creation setting changing part.

Hence, an effect is obtained that monitoring that is costly to be practiced constantly can be practiced only when it is necessary.

According to this embodiment, when practicing inference, the inference rule database is also referred to. Thus, the achieved phenomenon calculating/registering part can also obtain an achieved phenomenon that can be obtained from the achieved phenomenon as a result of inference.

Hence, an effect is obtained that each piece of attack activity definition information needs to describe only the minimum achieved phenomenon.

According to this embodiment, predicate logic expressing the configuration of the information system being the monitoring target is stored in the configuration information database. When practicing inference, the inference practicing part refers to the configuration information database.

Hence, an effect is obtained that a precondition in which information concerning the configuration of the information system, which does not appear on the event, is taken into account can be described.

According to this embodiment, the attack likelihood value is defined in the attack activity definition information, and the accumulated attack likelihood value is managed in the attack activity status information. When the accumulated attack likelihood value exceeds the attack determination threshold, occurrence of the attack is notified.

Hence, an effect is obtained that occurrence of the attack can be notified to the user only when a series of events similar to the behavior of an attacker occur. As a result, false detection can be reduced.

This embodiment has an effect that with the configuration information/inference rule editing part, the user can edit the configuration information database and the inference rule database.

Also, this embodiment has an effect that, with the display part, occurrence of the attack can be notified to the user.

It is also possible to implement the parts and databases configured in the attack detection apparatus in this embodiment to a separate apparatus connected via a network or the like.

So far, this embodiment describes:

- the attack activity definition information including the precondition, the achieved phenomenon, and the event contents;
- the attack activity definition information database which stores the attack activity definition information; and
- the attack activity predicting part which searches for attack activity definition information corresponding to the event which has occurred, searches for attack activity definition information which depends on the achieved phenomenon of the attack activity definition information searched for, and predicts an event which will occur next from the attack activity definition information searched for.

This embodiment describes: that the attack activity definition information includes an item called monitor setting so that the attack setting can be changed only when an attack activity is predicated; and that the event creation setting changing part requests the monitoring target apparatus to change the setting, in accordance with the monitor setting included in the attack activity definition information.

This embodiment describes: that the attack activity definition information includes an attack likelihood value which defines the increment of the accumulated attack likelihood value; and that attack occurrence determining part increments the accumulated attack likelihood value each time an event corresponding to the prediction occurs, and notifies the user of an occurrence of the attack when the accumulated attack likelihood value exceeds a certain threshold.

This embodiment describes: the configuration information database which stores information expressing the configuration of the information system being the monitoring target; and the inference rule database which defines an inference rule that always holds.

This embodiment describes use of predicate logic in the precondition, achieved phenomenon, inference rule, configuration information, and the monitor setting.

Embodiment 2

In Embodiment 1 described above, when an event occurs, unless a precondition of the event is satisfied, the event which has occurred is neglected (NO in S1105 of FIG. 13).

Namely, according to Embodiment 1, when the event 220 illustrated in FIG. 3 occurs, unless the precondition described in the attack activity definition information 205 is satisfied, a process of predicting an event that will occur next to the event 220 is not carried out.

According to this embodiment, an example will be described in which even when a precondition described in attack activity definition information 205 of an event which has occurred is not satisfied, a process of predicting an event that will occur next is carried out.

Figure 21:
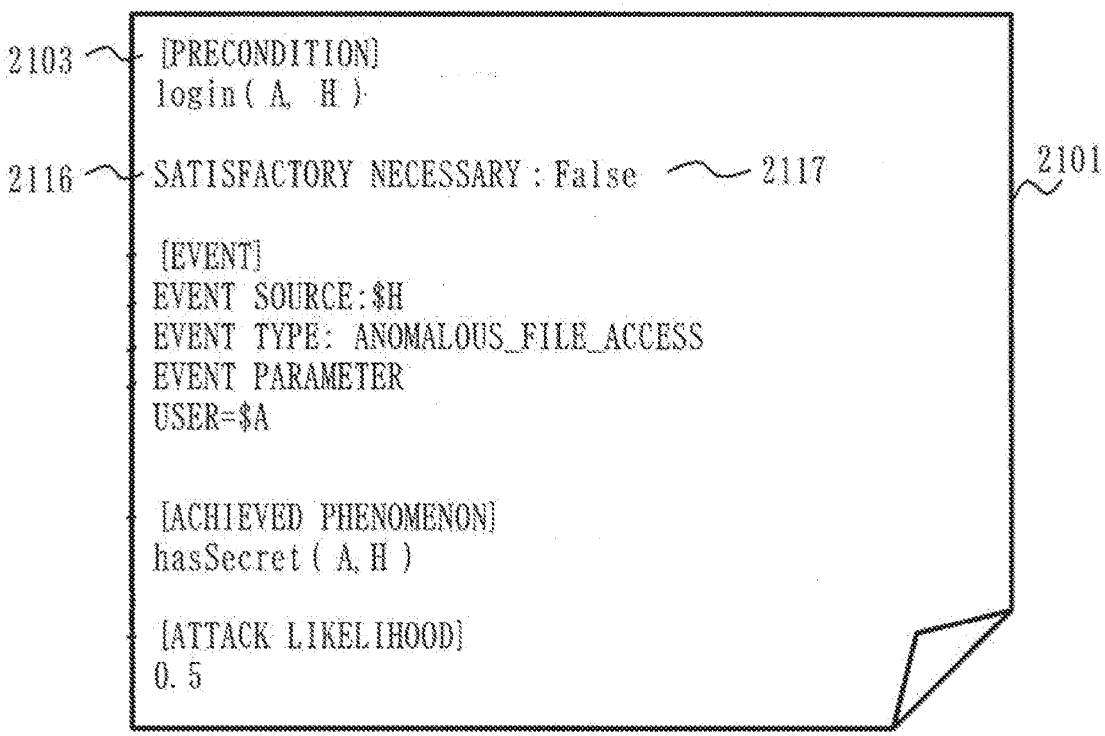
FIG. 21 is a diagram illustrating an example of attack activity definition information according to Embodiment 2.

According to this embodiment, as illustrated in FIG. 21, true/false value information (satisfactory-necessary flag 2116 and flag value 2117) that defines whether a condition need be satisfied, is added to the precondition of the attack activity definition information.

Where the flag value 2117 of the satisfactory-necessary flag 2116 is True, if the precondition is not satisfied, the process of predicting an event that will occur next is not carried out.

Where the flag value 2117 of the satisfactory-necessary flag 2116 is False, even if the precondition is not satisfied, the process of predicting an event that will occur next is carried out.

That is, the flag value 2117 of False is an identifier indicating that the process of extracting an observation predicted event is practiced even if the precondition (pre-event stage) is not satisfied, and is an example of a process practice identifier.

Of the elements of the attack activity definition information of FIG. 21, elements other than the satisfactory-necessary flag 2116 and the flag value 2117 are the same as those illustrated in FIG. 4, and a description thereof will accordingly be omitted.

The system configuration according to this embodiment is the same as that illustrated in FIG. 1. A configuration example of an attack detection apparatus 101 according to this embodiment is the same as that illustrated in FIG. 2.

Differences between Embodiment 1 and Embodiment 2 will mainly be described hereinafter.

Matters that are not explained in the following description are the same as those of Embodiment 1.

Figure 22:
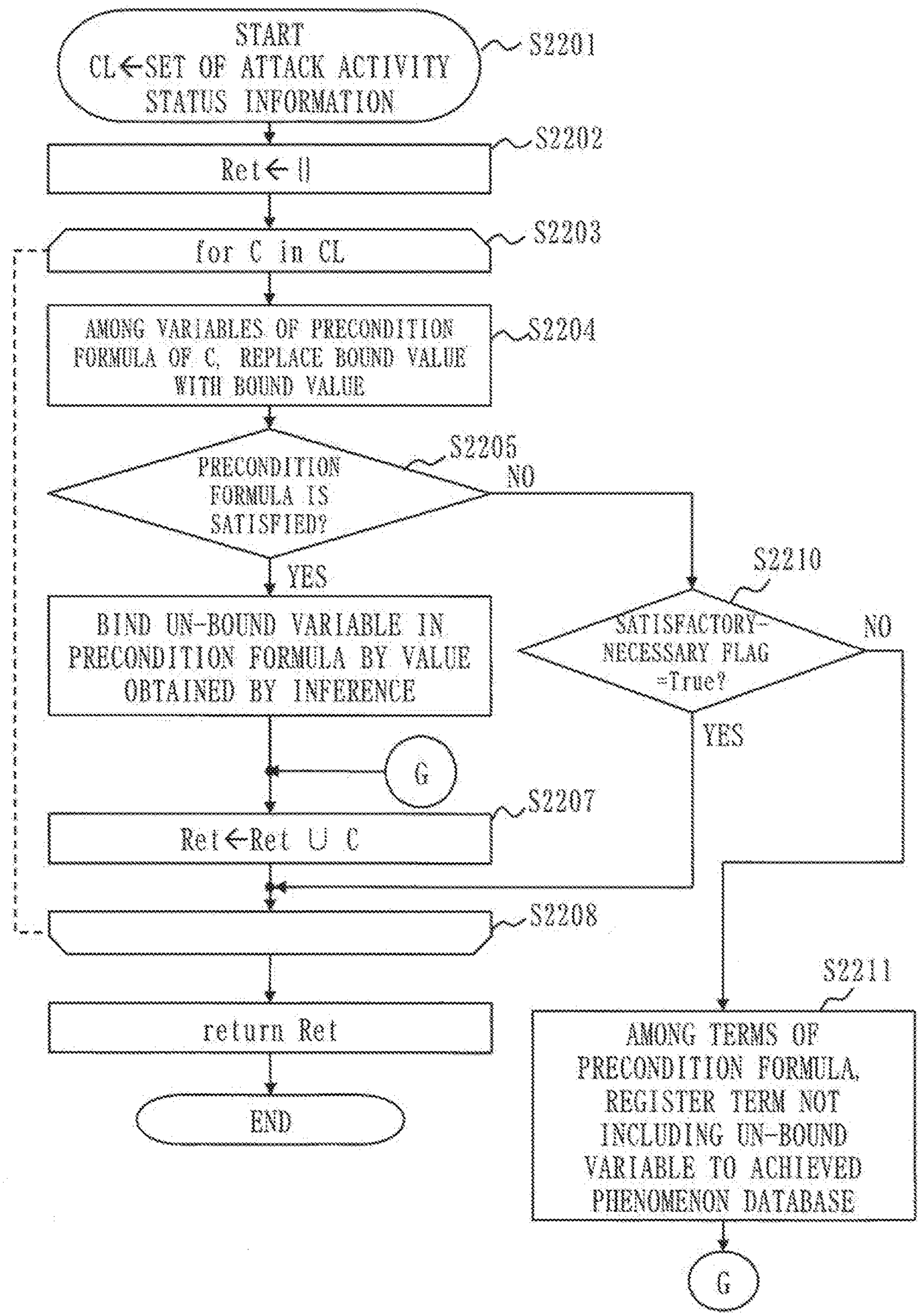
FIG. 22 is a flowchart illustrating in detail a precondition unsatisfied information delete process according to Embodiment 2.

FIG. 22 is a flowchart illustrating a process of a precondition unsatisfied information delete processing part (internal element of an attack activity status information searching part 107) according to this embodiment.

The flow of FIG. 22 is executed in place of the flow of FIG. 13 described in Embodiment 1.

Where the flag value 2117 of the satisfactory-necessary flag 2116 is False, even if the precondition is not satisfied, the precondition unsatisfied information delete processing part stores an event notified by observed event notice information, to the variable Ret described with reference to FIG. 13.

An actual process will be described hereinafter with reference to FIG. 22.

The process of S2201 through S2205 is the same as the process of S1101 through S1105 of FIG. 13.

If the process branches because of NO in S2205, that is, if a precondition 2103 described in attack activity definition 2101 of the event notified by the observed event notice information is not satisfied, the precondition unsatisfied information delete processing part refers to the flag value 2117 of the satisfactory-necessary flag 2116 (S2210).

If the flag value 2117 is True, the process of the precondition unsatisfied information delete processing part branches to S2208. The event notified by the observed event notice information is neglected in the same manner as in Embodiment 1, and the process of extracting the observation predicted event is not carried out.

If the flag value 2117 is False, the process branches to S2211.

In S2211, the precondition unsatisfied information delete processing part registers a term not including an un-bound variable, among the terms of the precondition formula whose variables are replaced by the bound values in S2204, to an achieved phenomenon database. The process advances to S2207.

Figure 10:
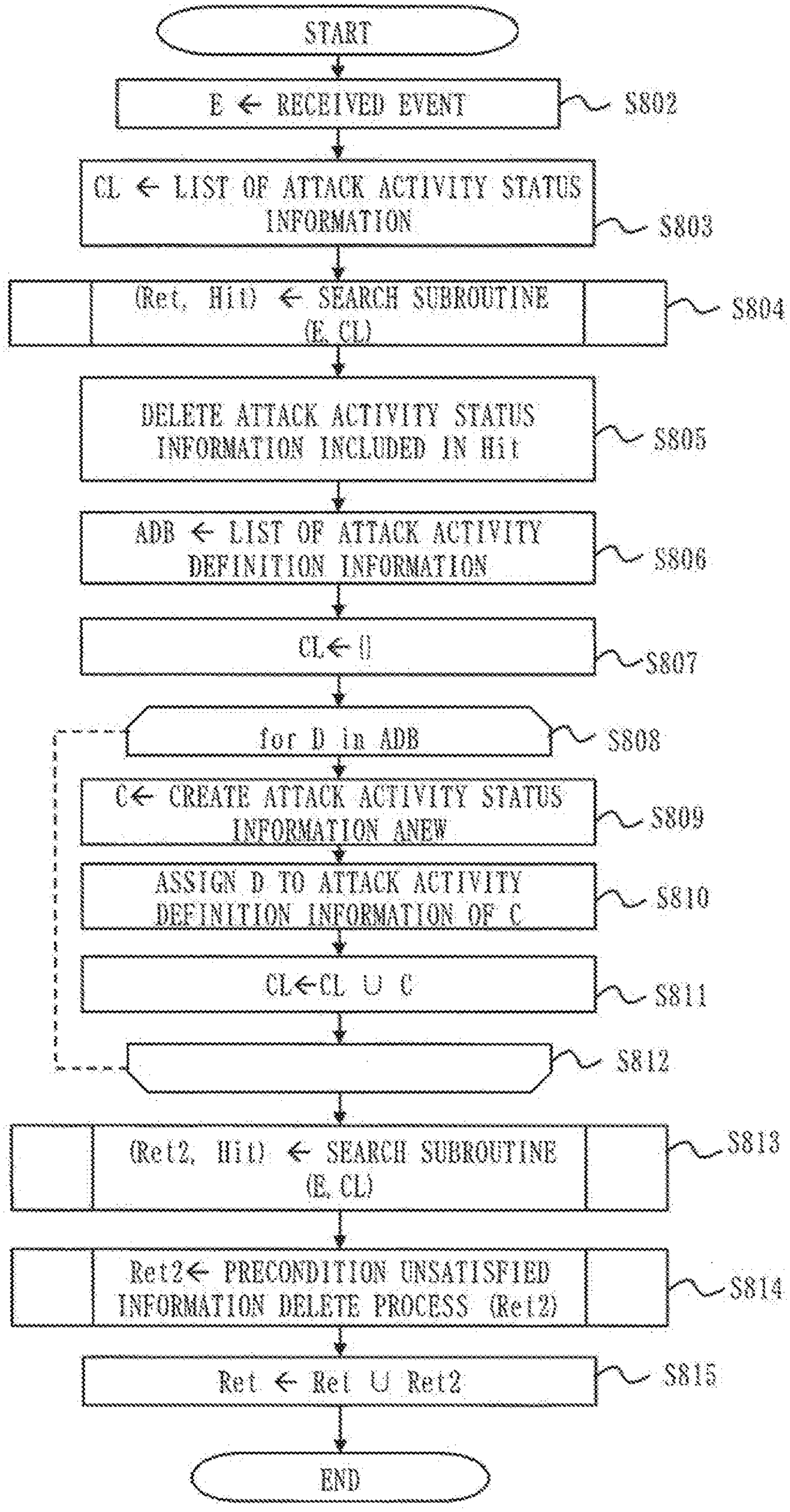
FIG. 10 is a flowchart illustrating in detail an attack activity status information search process according to Embodiment 1.

After that, the process from S504 onward is carried out (FIG. 22 illustrates in detail S814 of FIG. 10 which illustrates S503 of FIG. 7 in detail). A process of extracting an observation predicted event is carried out in accordance with the procedure described in Embodiment 1.

In this manner, the precondition unsatisfied information delete processing part carries out processing based on an inference that an activity that satisfies a precondition takes place in the background of the occurrence of the event even though the precondition is not satisfied.

As described above, according to this embodiment, as for an event that has occurred with the precondition being unsatisfied, a term not including the un-bound variables of the precondition can be registered to the achieved phenomenon database.

Therefore, an effect is obtained that occurrence of an event not predicted conventionally can be predicted in subsequent attack activity prediction.

According to this embodiment, the above process is carried out only when the flag value of the satisfactory-necessary flag is False. Therefore, an effect is obtained that the preconditions of not all the events whose preconditions are not satisfied need not be registered to the achieved phenomenon database.

Embodiment 3

In the above Embodiments 1 and 2, a future event is predicted based on an event notified by observed event notice information from the monitoring target apparatus.

In this embodiment, an example will be described where whether or not a precondition is satisfied is determined using all events observed by the monitoring target apparatus, including events not notified by the observed event notice information from the monitoring target apparatus.

Figure 23:
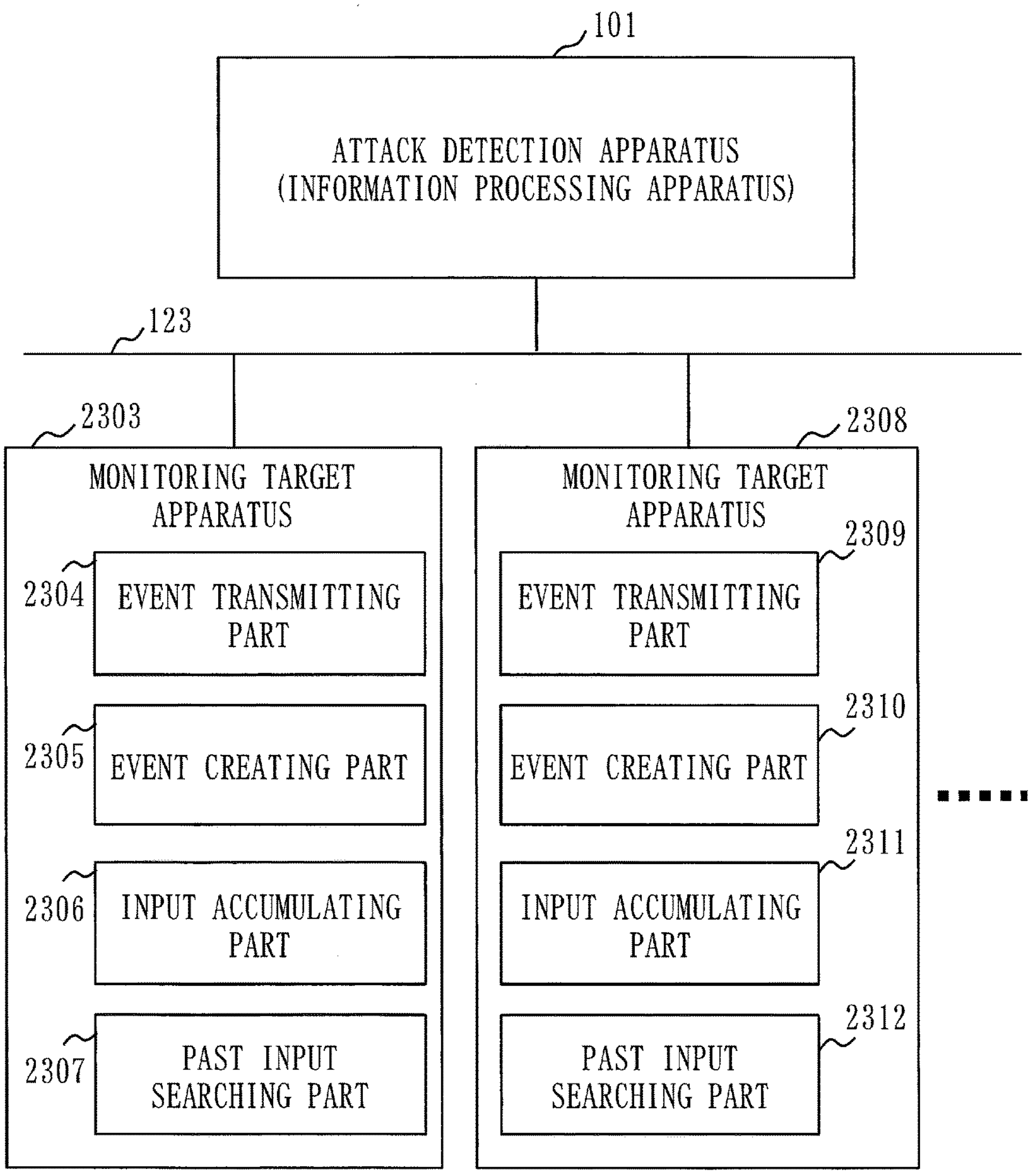
FIG. 23 is a diagram illustrating a system configuration example according to Embodiment 3.

FIG. 23 illustrates a system configuration example according to this embodiment.

In this embodiment, the configuration of a monitoring target apparatus 2303 and the configuration of a monitoring target apparatus 2308 to be connected to an attack detection apparatus 101 are different from Embodiment 1.

The internal configuration example of the attack detection apparatus 101 is as illustrated in FIG. 2.

Differences between Embodiment 3 and Embodiments 1 and 2 will mainly be described hereinafter.

Matters that are not described hereinafter are the same as those of Embodiments 1 and 2.

In the monitoring target apparatuses 2303 and 2308, respective event transmitting parts 2304 and 2309 are the same as the event transmitting parts 117 and 120 illustrated in FIG. 1.

Event creating parts 2305 and 2310 are respectively the same as the event creating parts 118 and 121 illustrated in FIG. 1.

Note that the event creating parts 118 and 121 notify the attack detection apparatus 101 of all the observed events by the observed event notice information, whereas the event creating parts 2305 and 2130 notify the attack detection apparatus 101 of only a specific event among the observed events, by the observed event notice information.

The event to be notified by the observed event notice information is set by an event creation setting changing part 122 of the attack detection apparatus 101.

For example, setting may be performed such that only an event that requires a monitoring cost of a predetermined level or less may be notified by the observed event notice information.

As described above, according to Embodiment 1, for example, when the event 220 illustrated in FIG. 3 occurs, if the precondition described in the attack activity definition information 205 is not satisfied, the process of predicting an event that occurs next to the event 220 is not carried out, nor accumulation of the attack likelihood value.

The attack detection apparatus 101 makes a determination as to whether or not the precondition described in the attack activity definition information 205 is satisfied, based on the event notified by the observed event notice information prior to the event 220.

More specifically, even when the precondition of the event 220 is satisfied by an unnotified event (for example, a high-cost event), the attack detection apparatus 101 determines that the precondition of the event 220 is not satisfied, and does not accumulate the attack likelihood value.

When, however, the precondition of the event 220 is satisfied by an unnotified event (for example, a high-cost event), an attack activity is actually in progress. Hence, a high accumulation attack likelihood value should be allocated to the attack activity that includes the event 220.

In this manner, even when an attack activity is actually in progress, if the event is not notified by the observed event notice information, sometimes the attack activity is not detected or is detected with a delay.

According to this embodiment, input accumulating parts 2306 and 2311 respectively accumulate event derivation information capable of deriving events in the respective monitoring target apparatuses 2303 and 2308 including an event not notified by the observed event notice information.

Past input searching parts 2307 and 2312 search event derivation information accumulated in the respective input accumulating parts 2306 and 2311.

The input accumulating parts 2306 and 2311 accumulate input information for the respective monitoring target apparatuses 2303 and 2308 being the sources of an event, as the event derivation information.

For example, with a monitoring target apparatus that discovers an attack by monitoring a packet, such as an IDS (Intrusion Detection System), packets are accumulated in the input accumulating parts 2306 and 2311.

Likewise, with a monitoring target apparatus that discovers an attack by monitoring a log occurring in the server or the like, logs are accumulated in the input accumulating parts 2306 and 2311.

According to this embodiment, an undiscovered event can be discovered by reexamining the accumulated packets or logs (by a method that cannot be carried out on a real-time basis due to the cost).

In the attack detection apparatus 101 according to this embodiment, a precondition unsatisfied information delete processing part, being an internal element of an attack activity status information searching part 107, analyzes the event derivation information of the input accumulating parts 2306 and 2311 using the past input searching parts 2307 and 2312.

Namely, the precondition unsatisfied information delete processing part analyzes the event derivation information of the input accumulating parts 2306 and 2311, and determines whether or not the precondition of the event 220 of FIG. 3 is satisfied by any one of events including the event not notified by the observed event notice information.

If the precondition of the event 220 of FIG. 3 is satisfied, the precondition unsatisfied information delete processing part traces back the event derivation information of the input accumulating parts 2306 and 2311 chronologically to further detect events involving dependencies.

Then, the precondition unsatisfied information delete processing part accumulates the attack likelihood value of the detected event sequence, starting with the beginning through the event 220 sequentially.

Figure 30:
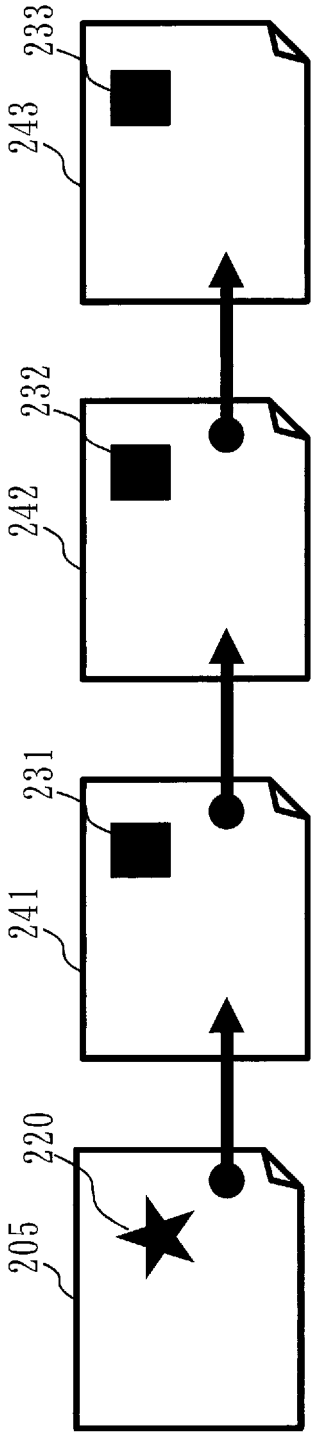
FIG. 30 is a diagram illustrating an event sequence according to Embodiment 2.

For example, assume that the precondition of attack activity definition information 205 of an event 220 is described in the achieved phenomenon of attack activity definition information 241 of an event 231, as illustrated in FIG. 30.

Also, assume that the precondition of the attack activity definition information 241 of the event 231 is described in the achieved phenomenon of the attack activity definition information 242 of an event 232.

Likewise, assume that the precondition of attack activity definition information 242 of the event 232 is described in the achieved phenomenon of attack activity definition information 243 of an event 233.

The precondition unsatisfied information delete processing part detects an event sequence of the events 231, 232, and 233 by tracing back from the event 220 sequentially.

Furthermore, the precondition unsatisfied information delete processing part accumulates the attack likelihood value of the events 233, 232, 231, and 220.

If the accumulated value of the attack likelihood value exceeds a threshold, an attack occurrence determining part 106 notifies the user of an occurrence of an attack via a display part 115 (S506 of FIG. 7).

Figure 24:
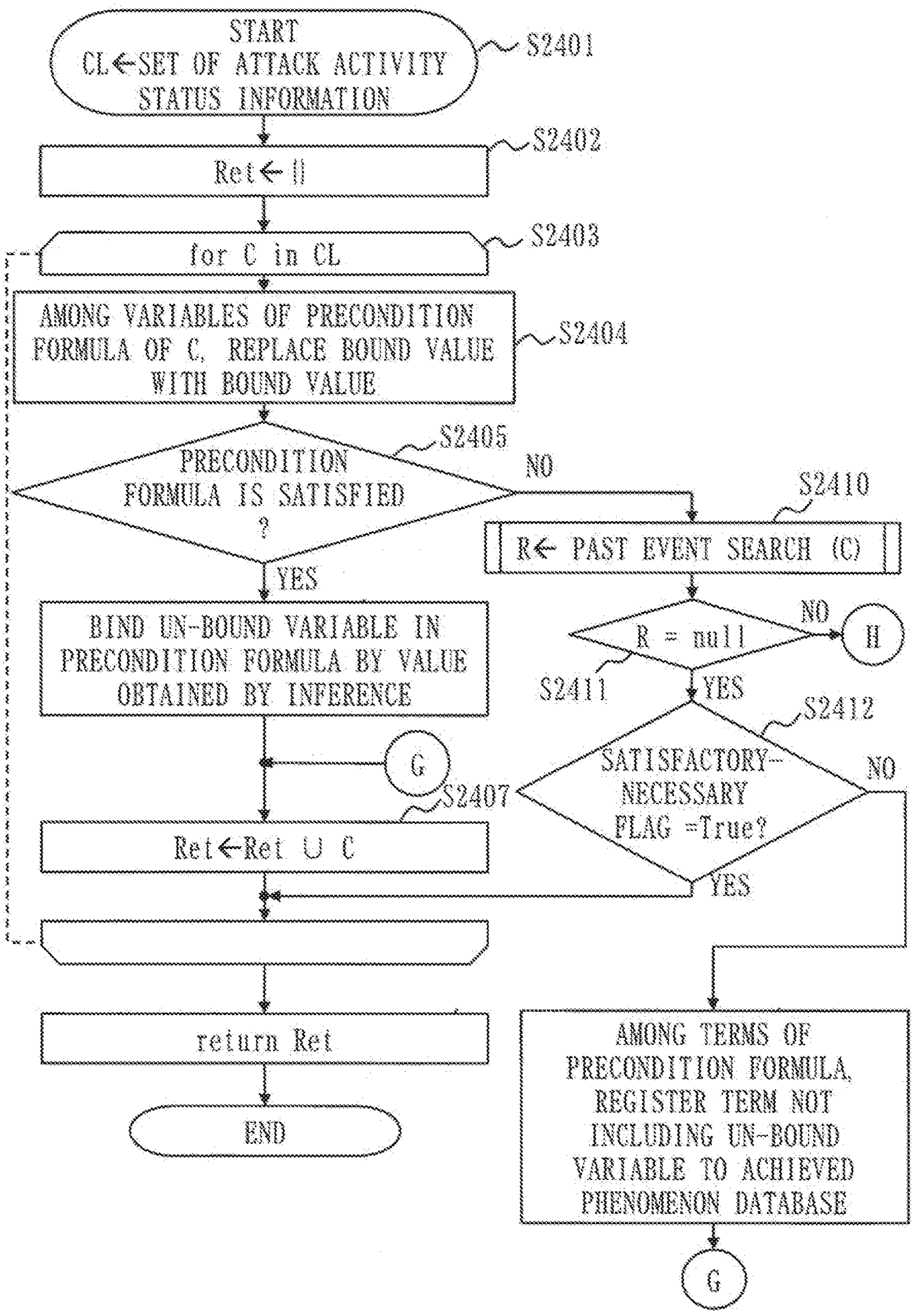
FIG. 24 is a flowchart illustrating in detail a precondition unsatisfied information delete process according to Embodiment 3.

The operation of the precondition unsatisfied information delete processing part according to this embodiment will be described with reference to FIG. 24.

S2401 through S2405 are the same as S1101 through S1105 of FIG. 13.

If a precondition formula is not satisfied in S2405, in S2410, the precondition unsatisfied information delete processing part calls a past event search process for attack activity status information C, and stores the result of the past event search process to a variable R.

The past event search process will be described with reference to FIGS. 26 and 27.

As indicated by S2601, the past event search process is called with the attack activity status information C being the search target, as an argument.

Then, in S2602, a set of unsatisfied terms, among terms constituting the precondition of the attack activity status information C, is assigned to a variable TS.

In S2603, a variable CS to store an index variable i and a return value is initialized.

In S2604, an attack activity definition information list stored in the attack activity definition information database is assigned to a variable ADB.

In a loop of S2605 through S2616, the process is carried out after sequentially extracting the terms in the variable TS and assigning them to a variable t.

In S2606, a variable evs is initialized by an empty array, and a variable effects is initialized by a set of voids.

In a loop of S2607 through S2613, the process is carried out after sequentially extracting the attack activity definition information in the variable ADB and assigning them to a variable e.

In S2608, whether the value of the variable e can be detected with the present setting of the monitoring target apparatus is checked.

If the value of the variable e is already in a detectable state, the process branches to YES. Via S2613, the process returns to S2607 at the beginning of the loop. The process continues for the next value of the variable e.

If the process branches to NO in S2608, in S2609, whether the achieved phenomenon of the variable e can match a term expressed by the variable t is checked.

If the achieved phenomenon of the variable e does not match the term expressed by the variable t, the process branches from S2609 to NO. Via S2613, the process returns to S2607 at the beginning of the loop. The process continues for the next value of the variable e.

If the process branches to YES in S2609, then in S2610, a variable used in the achieved phenomenon of the variable e is bound to a value in the variable t.

Then, in S2611, a search is carried out for a past event that matches the variable e.

This search is practiced in the following manner.

Of the variables used in the event in the variable e, the variable bound in S2610 is replaced by a bound value. The event after replacement is inputted to the past input searching part on the monitoring target apparatus, and the past input searching part is called.

The past input searching part searches information accumulated in the input accumulating part.

As the result of the search, if a corresponding event is detected, attack activity status information reflecting the contents of the detected event is created, and the created attack activity status information is assigned to a variable Cp.

The attack activity definition information of the attack activity status information assigned to the variable Cp is the same as the attack activity definition information expressed by the variable e.

The variable used for describing the event in the attack activity definition information expressed by the variable e is bound by the contents of the event searched for.

As the result of the search, if the variable Cp is found, that is, if an event that matches the variable e is found, the process branches to YES in S2612. Via a terminal (I), the process goes to S2701 of FIG. 27.

If the process branches to NO in S2612, the process returns to S2607 at the beginning of the loop via S2613. Then, the process is carried out for the next value of the variable e.

Figure 27:
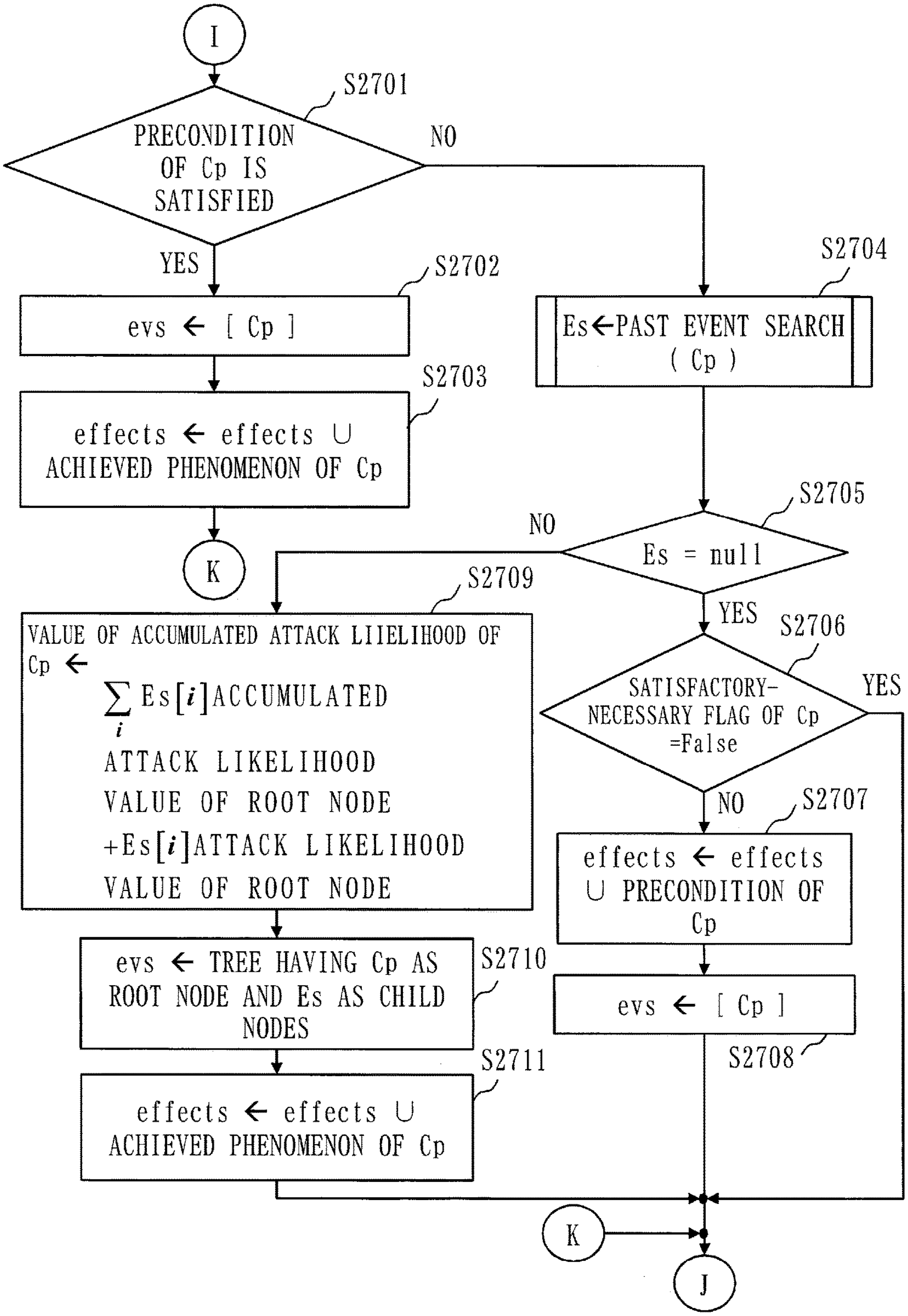
FIG. 27 is a flowchart illustrating in detail the past event search process according to Embodiment 3.

In S2701 of FIG. 27, whether the precondition of the variable Cp is satisfied is checked.

If the precondition of the variable Cp is satisfied, the process branches to YES. In S2702, an array having the variable Cp as the only element is created, and the created array is assigned to the variable evs.

After that, in S2703, the achieved phenomenon of the variable Cp is added to the variable effects. The process moves to a terminal (K).

If the process branches to NO in S2701, then in S2704, the past event search process is called recursively using the variable Cp as the argument.

The result of the past event search process is stored in a variable Es.

The variable Es is an array of trees of attack activity status information.

In S2705, if the variable Es is NULL, the process branches to YES. In S2706, whether the satisfactory-necessary flag of the variable Cp is False is checked.

If the satisfactory-necessary flag of the variable Cp is False, the process branches to YES. Via a terminal (J), the process advances to S2614.

If the process branches to NO in S2706, in S2707, of the terms of the precondition of the variable Cp, a term that does not include an un-bound variable is added to the variable effects.

After that, in S2708, the achieved phenomenon of the variable Cp is added to the variable effects, and the process shifts to the terminal (J).

If the process branches to NO in S2705, in S2709, the accumulated attack likelihood value of the variable Cp is updated to a value that is a sum of the accumulated attack likelihood value of the attack activity status information of the root nodes of the trees in all the arrays in the variable Es and the attack likelihood values of the root nodes of the trees.

After that, in S2710, a tree having the variable Cp as the root node and the elements of the variable Es (each element is tree-structure data) as the child nodes are created, and the created tree is assigned to the variable evs.

After that, in S2711, the achieved phenomenon of the variable Cp is added to the variable effects, and the process moves to the terminal (J).

Figure 26:
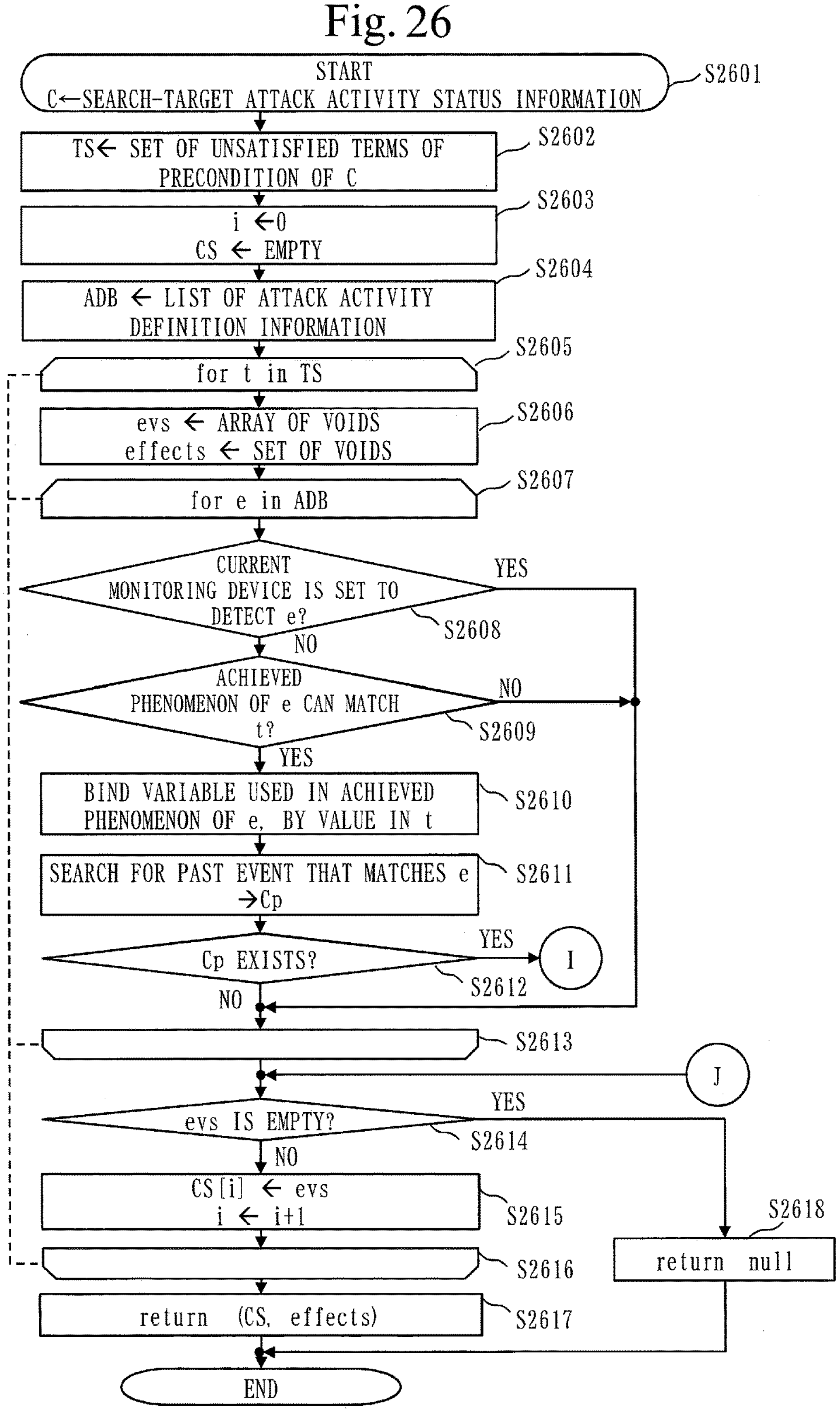
FIG. 26 is a flowchart illustrating in detail a past event search process according to Embodiment 3.

Via the terminal (J), or upon end of the loop of S2607 through S2613, S2614 of FIG. 26 is executed to check whether the variable evs is empty.

If the variable evs is empty, the process branches to YES. In S2618, null is returned to the caller, and the process ends.

If the process branches to NO in S2614, the value of the variable evs is stored as the ith element of the variable CS, and 1 is added to I (S2615).

After that, the process returns to S2605 via S2616, and the process is carried out for the next value of the variable t.

When the process is completed for all the variables t, in S2617, the variable CS and the variable effects are returned to the caller, and the process ends.

Back to FIG. 24 again, the process from S2410 onward will be described.

If the result returned in S2410 is null, the process branches from S2411 to YES. The process advances to S2412.

The subsequent operations are the same as those of Embodiment 2.

Figure 25:
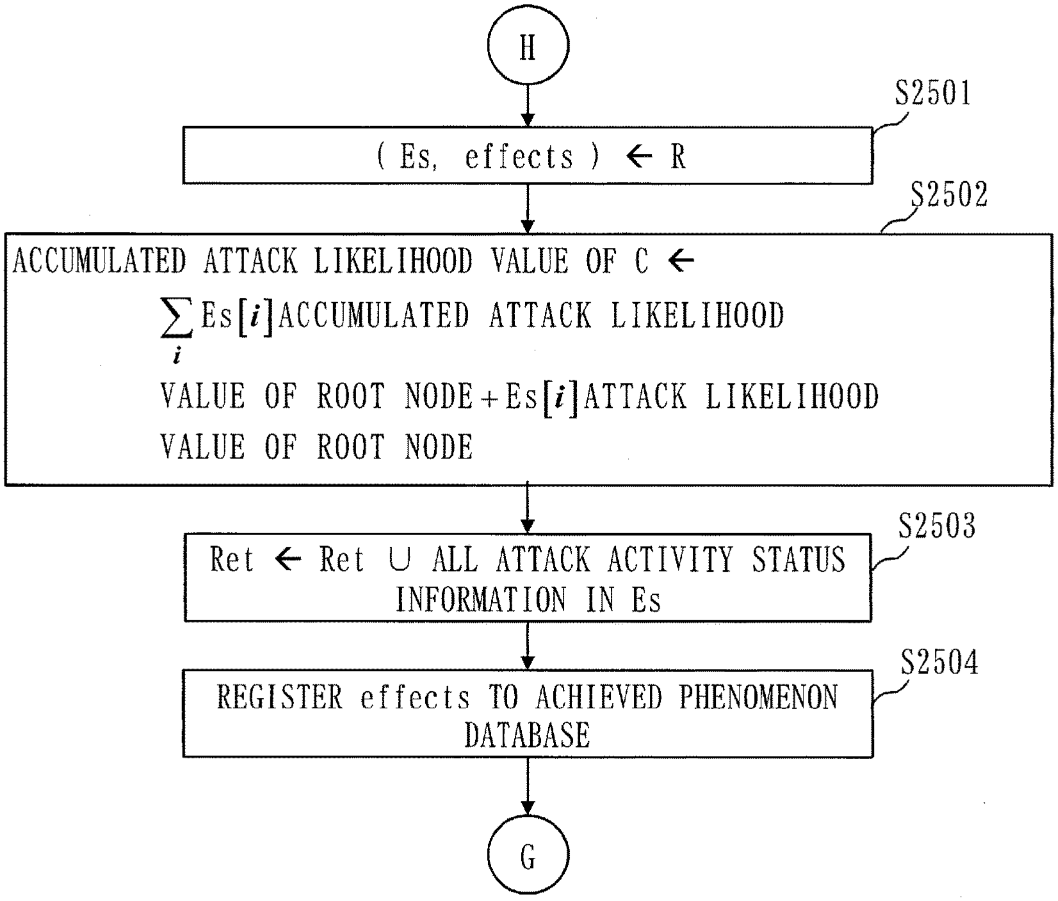
FIG. 25 is a flowchart illustrating in detail the precondition unsatisfied information delete process according to Embodiment 3.

If the process branches from S2411 to NO, via a terminal (H), the process advances to S2501 of FIG. 25.

In S2501, the attack activity status information and the achieved phenomenon set which are stored in the variable R are assigned to the variable Es and the variable effects, respectively.

Then, in S2502, the accumulated attack likelihood value of the variable C is updated to a value obtained by summing the accumulated attack likelihood value of the attack activity status information of the root nodes of the trees in all the arrays in the variable Es and the attack likelihood values of the root nodes of the trees.

Then, in S2503, all attack activity status information in the variable Es are added to a variable Ret. Furthermore, in S2504, the achieved phenomenon stored in the variable effects is registered to the achieved phenomenon database.

After that, the process returns to S2407 via a terminal (G).

As described above, according to this embodiment, concerning an event that has occurred with the precondition being unsatisfied, whether an event that satisfies the precondition of this event occurs is checked by searching the information accumulated in the monitoring target apparatus.

Therefore, Embodiments 1 and 2 have a problem that an accumulated attack likelihood value lower than reality is allocated to a series of attack activities to which a higher accumulated attack likelihood value should be allocated, and the series of attack activities are excluded from attack activity detection, or are detected with a delay. An effect of solving this problem is obtained.

Embodiment 4

In Embodiments 1 to 3, the person who creates the attack activity definition information needs to define the attack likelihood value in the attack activity definition information.

In Embodiment 4, an example will be described where the attack likelihood value is automatically determined based on the event occurrence frequency of the normal state.

Figure 28:
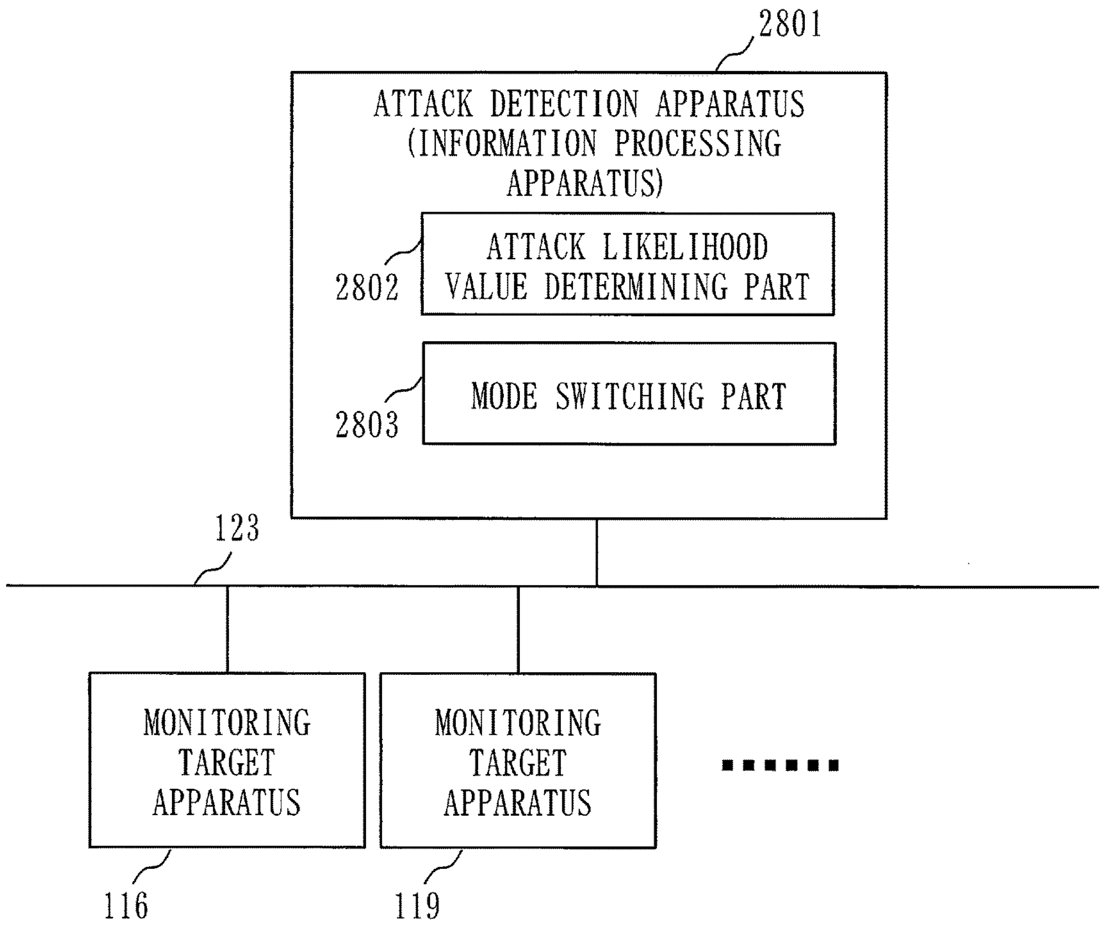
FIG. 28 is a diagram illustrating a system configuration example according to Embodiment 4.

FIG. 28 illustrates a system configuration example of this embodiment.

Referring to FIG. 28, an attack detection apparatus 2801 has a configuration that an attack likelihood value determining part 2802 and a mode switching part 2803 are added to the attack detection apparatus 101 indicated in Embodiment 1.

Namely, the attack detection apparatus 2801 according to this embodiment has a configuration that the attack likelihood value determining part 2802 and the mode switching part 2803 are added to the configuration illustrated in FIG. 2.

The attack likelihood value determining part 2802 determines the attack likelihood value described in the attack activity definition information based on the reception frequency of the observed event notice information.

The mode switching part 2803 switches the operation mode of the attack detection apparatus 2801.

Monitoring target apparatuses 116 and 119 are the same as those indicated in Embodiment 1.

Differences between Embodiment 4 and Embodiment 1 will mainly be described hereinafter.

Matters that are not explained in the following description are the same as those of Embodiment 1.

An operation that determines the attack likelihood value of the attack activity definition information according to this embodiment will be described.

First, via the mode switching part 2803 of the attack detection apparatus 2801, the administrator switches the operation mode of the attack detection apparatus 2801 from the normal operation mode to the attack likelihood determination mode.

In this attack likelihood determination mode, the observed event notice information from the monitoring target apparatuses 116 and 119 are sent to the attack likelihood value determining part 2802.

The attack likelihood value determining part 2802 that has received the observed event notice information calls the search subroutine (S804 and S813 of FIG. 10) described in Embodiment 1, and acquires a set of corresponding attack activity definition information.

The attack likelihood value determining part 2802 also manages counters each for corresponding attack activity definition information (the initial value is 0). Each time the attack likelihood value determining part 2802 receives observed event notice information during the attack likelihood value determination mode, the attack likelihood value determining part 2802 increments the value of the counter for the corresponding attack activity definition information by 1.

At a lapse of predetermined time, the administrator operates the mode switching part 2803 again to switch the operation mode of the attack detection apparatus 2801 from the attack likelihood determination mode to the normal operation mode.

Based on the counter values of the individual attack activity definition information which are counted by the time switching to the normal operation mode is made, the attack likelihood value determining part 2802 determines the attack likelihoods of the attack activity definition information.

The attack likelihood value can be determined by a following calculation formula, for example.

$$\text{Attack likelihood value}=1/(\text{counter value}+1)$$

In this manner, according to this embodiment, the attack detection apparatus 2801 is provided with the attack likelihood value determining part 2802 and the mode switching part 2803.

This embodiment has an effect that the attack likelihood value may be determined automatically.

The calculation formula of the attack likelihood value is not limited to that indicated above.

The increment of the counter value that is made when the observed event notice information is received is not limited to 1.

Embodiment 5

In Embodiment 1, the configuration information need be inputted by the administrator via the configuration information/inference rule editing part 113.

In Embodiment 5, a configuration will be described in which the configuration information may be obtained automatically from an account management server apparatus and a configuration management database which are connected to the network.

Figure 29:
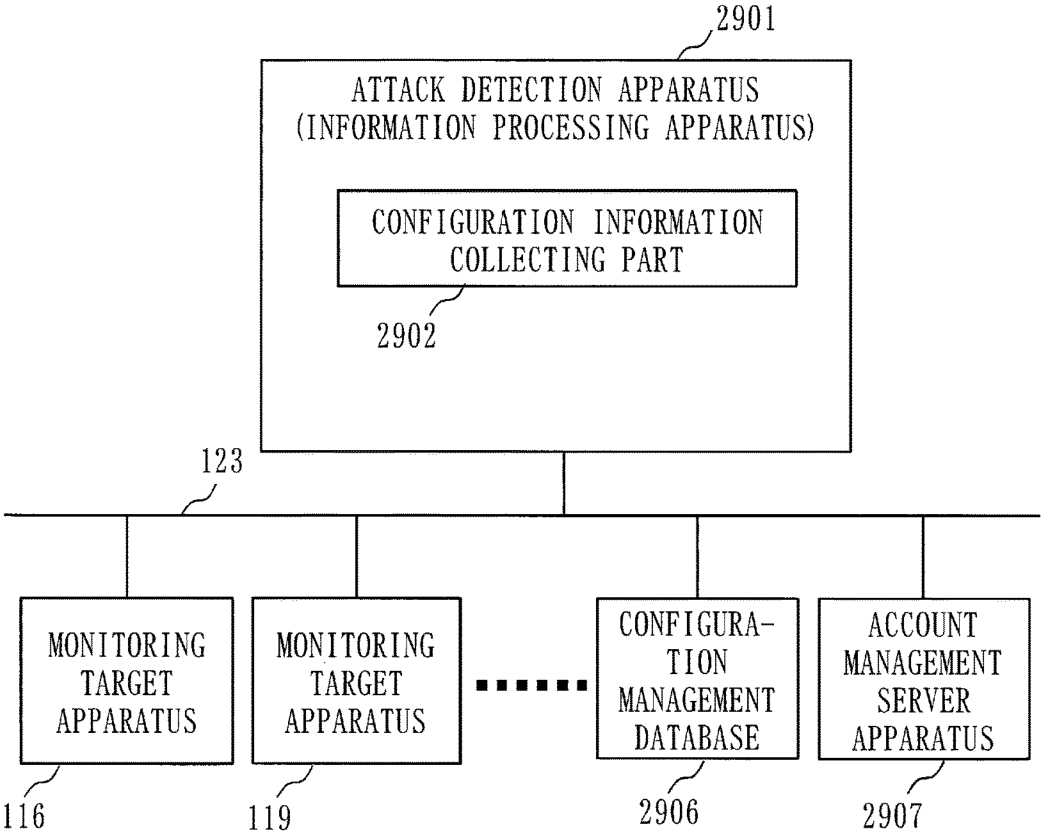
FIG. 29 is a diagram illustrating a system configuration example according to Embodiment 5.

FIG. 29 is a diagram illustrating a system configuration example of this embodiment.

An attack detection apparatus 2901 according to this embodiment has a configuration that a configuration information collecting part 2902 is added to the attack detection apparatus 101 indicated in Embodiment 1.

Namely, the attack detection apparatus 2901 according to this embodiment has a configuration that the configuration information collecting part 2902 is added to the configuration illustrated in FIG. 2.

The configuration information collecting part 2902 collects configuration information from a configuration management database 2906 and an account management server apparatus 2907 which are included in the information system.

Monitoring target apparatuses 116 and 119 are the same as those indicated in Embodiment 1.

The configuration management database 2906 is a database that manages the product names, versions, IP addresses, host names, and the like of instruments on the network 123.

The account management server apparatus 2907 is a server that manages the account information of the user who utilizes a network 123.

According to this embodiment, in the attack detection apparatus 2901, at the time of initialization, or periodically, the configuration information collecting part 2902 accesses the configuration management database 2906, collects the types, IP addresses, and the like of the devices operating on the network 123, and converts the collected information into an expression that utilizes a predicate logic.

The configuration information collecting part 2902 stores the collected information (configuration information) converted into the predicate logic expression, to a configuration information database 112.

Likewise, at the time of initialization, or periodically, the configuration information collecting part 2902 also accesses the account management server apparatus 2907, collects information on the user name and group, and converts the collected information into an expression that utilizes a predicate logic.

Then, the configuration information collecting part 2902 stores the collected information (configuration information) converted into the predicate logic expression, to the configuration information database 112.

In this manner, according to this embodiment, the configuration information collecting part 2902 collects the configuration information automatically from the configuration management database 2906 and the account management server apparatus 2907. Therefore, an effect is obtained that the configuration information database 112 need not be edited manually.

Finally, a hardware configuration example of the attack detection apparatus 101 according to Embodiments 1 to 5 will be described with reference to FIG. 20.

The attack detection apparatus 101 is a computer and can implement the elements of the attack detection apparatus 101 by means of programs.

As for the hardware configuration of the attack detection apparatus 101, a computing unit 901, an external storage unit 902, a main storage unit 903, a communication unit 904, and an input/output unit 905 are connected to a bus.

The computing unit 901 is a CPU (Central Processing Unit) which executes the programs.

The external storage unit 902 is, for example, a ROM (Read Only Memory), a flash memory, or a hard disk unit.

The main storage unit 903 is a RAM (Random Access Memory).

The communication unit 904 corresponds to the physical layer of the event receiving part 108.

The input/output unit 905 is, for example, a mouse, a keyboard, or a display unit.

The programs are usually stored in the external storage unit 902. The programs as loaded in the main storage unit 903 are sequentially read and executed by the computing unit 901.

The programs are programs that implement functions each explained as "part" (the attack activity candidate storage part 104 excluded; the same applies hereinafter) illustrated in FIG. 2 and the like.

Furthermore, the external storage unit 902 also stores an operating system (OS). At least part of the OS is loaded to the main storage unit 903. The computing device unit, while executing the OS, executes the programs each of which implements the function of "part" illustrated in FIG. 2 and the like.

The information, data, signal values, and variable values representing the results of the processes described in the explanations of Embodiments 1 to 5 as "to conclude", "to determine", "to extract", "to detect", "to set", "to register", "to predict", "to select", "to create", "to input, "to output", and the like are stored, in the form of files, in the main storage unit 903.

An encryption key and a decryption key, random values, and parameters may be stored, in the form of files, in the main storage unit 903.

Figure 20:
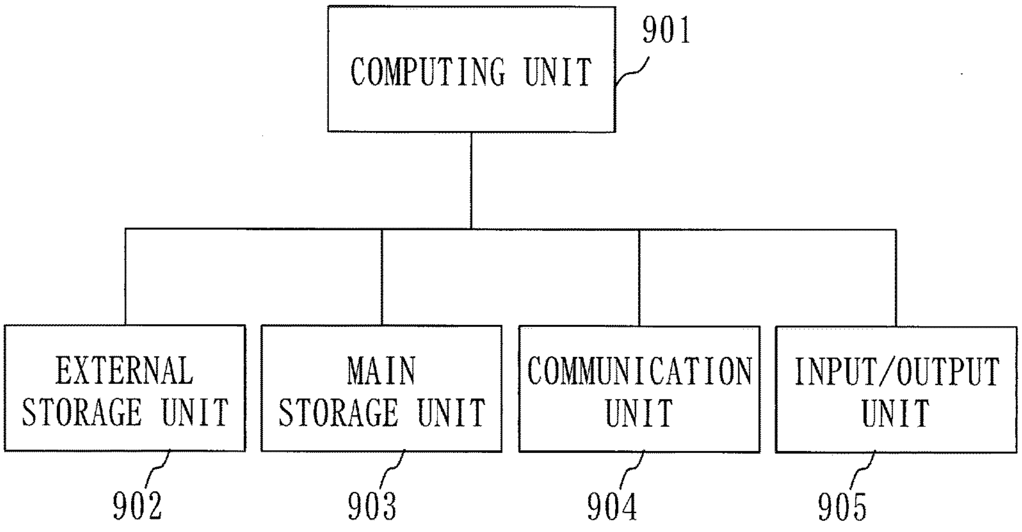
FIG. 20 is a diagram illustrating a hardware configuration example of the attack detection apparatus according to Embodiment 1.

The configuration of FIG. 20 merely presents an example of the hardware configuration of the attack detection apparatus 101. The hardware configuration of the attack detection apparatus 101 is not limited to the configuration illustrated in FIG. 20, but can be another configuration.

The monitoring target apparatus described in Embodiments 1 to 5 may have the hardware configuration of FIG. 20, or any other hardware configuration.

The information processing method according to the present invention can be implemented by the procedure described in Embodiments 1 to 5.

REFERENCE SIGNS LIST

101: attack detection apparatus; 102: achieved phenomenon calculating/registering part; 103: inference practicing part; 104: attack activity candidate storage part; 105: attack activity predicting part; 106: attack occurrence determining part; 107: attack activity status information searching part; 108: event receiving part; 109: achieved phenomenon database; 110: inference rule database; 111: attack activity definition information database; 112: configuration information database; 113: configuration information/inference rule editing part; 114: attack activity definition information editing part; 115: display part; 116: monitoring target apparatus; 117: event transmitting part; 118: event creating part; 119: monitoring target apparatus; 120: event transmitting part; 121: event creating part; 122: event creation setting changing part; 123: network; 2303: monitoring target apparatus; 2304: event transmitting part; 2305: event creating part; 2306: input accumulating part; 2307: past input searching part; 2308: monitoring target apparatus; 2309: event transmitting part; 2310: event creating part; 2311: input accumulating part; 2312: past input searching part; 2801: attack detection apparatus; 2802: attack likelihood value determining part; 2803: mode switching part; 2901: attack detection apparatus; 2902: configuration information collecting part; 2906: configuration management database; 2907: account management server apparatus

The invention claimed is:

1. An information processing apparatus for detecting an attacked on one or more monitored target computing apparatuses, the information processing apparatus comprising:

a memory configured to store, for a plurality of events, event stage information describing an event, a pre-event stage, and a post-event stage, the event being observed by an information system when an attack against the information system is underway, the pre-event stage being a stage of a progress of an attack before the event is observed, the post-event stage being a stage of a progress of an attack after the event is observed; and processing circuitry configured to receive an observed event notice from one of the one or more monitored target computing apparatuses, the observed event notice including information notifying an observed event which is observed by the information system;

acquire corresponding event stage information describing the observed event received in the observed event notice information;

determine whether attack activity status information has been stored for the observed event;

create, in response to a determination that no attack activity status information has been stored for the observed event, new attack activity status information for the observed event based on the corresponding event stage information;

update, in response to a determination that attack activity status information has been stored for the observed event, an accumulated attack likelihood in the stored attack activity status information;

acquire the accumulated attack likelihood for the observed event from the attack activity status information corresponding to the observed event;

notify a user of an occurrence of an attack if the acquired accumulated attack likelihood is greater than a predefined value;

determine, if the acquired accumulated attack likelihood is less than or equal to the predefined value, a predicted observation event that can occur next by acquiring a post-event stage of the observed event from the corresponding event stage information, acquiring event stage information, including attack activity definition information, for an event corresponding to the acquired post-event stage that describes a pre-event stage corresponding to the acquired post-event stage of the observed event, determining whether pre-event stage conditions of the acquired attack activity definition information have been satisfied, and setting as the predicted observation event the event corresponding to the acquired post-event stage if the pre-event stage conditions have been satisfied.

2. The information processing apparatus according to claim 1, wherein the processing circuitry is further configured to relate, when a new predicted observation event is determined based on the observed event, the updated accumulated attack likelihood to event stage information describing the new predicted observation event.

3. The information processing apparatus according to claim 1, wherein the processing circuitry is further configured to notify a user of an occurrence of an attack by displaying a notice message notifying that an attack against the information system is underway.

4. The information processing apparatus according to claim 1, wherein the received observed event notice information includes a type of an observed event and a variable value specifying an observed event, and each time the observed event notice information is received and a predicted observation event is determined, the processing circuitry is configured to relate an accumulated attack likelihood and a variable value notified by observed event notice information to event stage information describing a predicted observation event, acquire event stage information describing an event corresponding to a type of observed event notified by received observed event notice information, and compare a variable value related to the acquired event stage information describing an event corresponding to a type of observed event with a variable value notified by observed event notice information, and update, if the compared variable values are identical, accumulated attack likelihood.

5. The information processing apparatus according to claim 1, wherein the processing circuitry is further configured to store event stage information describing a monitoring operation start threshold to cause a device included in the information system to start a predetermined monitoring operation, and cause, if the updated accumulated attack likelihood exceeds the monitoring operation start threshold, the device included in the information system to start the monitoring operation.

6. The information processing apparatus according to claim 1, wherein the processing circuitry determines whether or not the pre-event stage conditions of the acquired attack activity definition information have been satisfied by referring to inference rule information that describes an inference logic.

7. The information processing apparatus according to claim 1, wherein the processing circuitry determines whether the pre-event stage conditions of the acquired attack activity definition information have been satisfied by referring to configuration information that describes a configuration of the information system.

8. The information processing apparatus according to claim 1, wherein the processing circuitry stores event stage information using a predicate logic.

9. The information processing apparatus according to claim 1, wherein event stage information includes a process practice identifier indicating that a process of determining the predicted observation event is practiced even if a pre-event stage is unsatisfied for any one event, and the processing circuitry is configured to acquire, even if a pre-event stage described in acquired event stage information is unsatisfied, the post-event stage of the observed event, acquire the event stage information describing the pre-event stage corresponding to the acquired post-event stage of the observed event, and determine the predicted observation event based on the acquired event stage information describing the pre-event stage, and when the acquired event stage information describing the pre-event stage does not describe a process practice identifier, if a pre-event stage described in the acquired event stage information describing the pre-event stage is unsatisfied, does not determine a predicted observation event.

10. The information processing apparatus according to claim 1, wherein the information system accumulates event derivation information capable of deriving an event, including an event in the information system which is not notified by the observed event notice information, and wherein the processing circuitry is further configured to acquire event stage information describing the observed event notified by the observed event notice information received, determine whether or not a pre-event stage described in acquired event stage information is satisfied based on the event derivation information accumulated in the information system, and if the pre-event stage is satisfied, acquire the post-event stage of the observed event from acquired event stage information, acquire event stage information describing a pre-event stage corresponding to the acquired post-event stage of the observed event, and extract the predicted observation event.

11. The information processing apparatus according to claim 10, wherein event stage information includes an attack likelihood value indicating a likelihood of an attack against the information system when an event is observed, and as a result of determining whether or not the pre-event stage is satisfied based on the event derivation information accumulated in the information system, if the pre-event stage is satisfied, the processing circuitry is configured to analyze the event derivation information accumulated in the information system and select at least one event stage information from among a plurality of pieces of stored event stage information stored, and accumulate an attack likelihood value described in the selected event stage information and an attack likelihood value, to obtain an accumulated value of an attack likelihood value.

12. The information processing apparatus according to claim 1, wherein the processing circuitry is further configured to determine the accumulated attack likelihood based on a reception frequency of how often the observed event notice information is received.

13. The information processing apparatus according to claim 7, wherein the processing circuitry is further configured to collect the configuration information from the information system.

14. An information processing method for detecting an attack on one or more monitored target computing apparatuses performed by a computer that stores, for a plurality of events, event stage information describing an event, a pre-event stage, and a post-event stage, the event being observed by an information system when an attack against the information system is underway, the pre-event stage being a stage of a progress of an attack before the event is observed, the post-event stage being a stage of a progress of an attack after the event is observed, the information processing method comprising:

receiving an observed event notice from one or more of the one or more monitored target computing apparatuses, the observed event notice including information notifying an observed event which is observed by the information system;

acquiring corresponding event stage information describing the observed event received in the observed event notice information;

determining whether attack activity status information has been stored for the observed event, creating, in response to a determination that no attack activity status information has been stored for the observed event, new attack activity status information for the observed event based on the corresponding event stage information;

updating, in response to a determination that attack activity status information has been stored for the observed event, an accumulated attack likelihood in the stored attack activity status information;

acquiring the accumulated attack likelihood for the observed event from the attack activity status information corresponding to the observed event;

notifying a user of an occurrence of an attack if the acquired accumulated attack likelihood is greater than a predefined value;

determining, if the acquired accumulated attack likelihood is less than or equal to the predefined value, a predicted observation event that can occur next by acquiring a post-event stage of the observed event from the corresponding event stage information, acquiring event stage information, including attack activity definition information, for an event corresponding to the acquired post-event stage that describes a pre-event stage corresponding to the acquired post-event stage of the observed event, determining whether pre-event stage conditions of the acquired attack activity definition information have been satisfied, and setting as the predicted observation event the event corresponding to the acquired post-event stage if the pre-event stage conditions have been satisfied.

15. A non-transitory computer readable medium storing a program to cause a computer that stores, for a plurality of events, event stage information describing an event, a pre-event stage, and a post-event stage, the event being observed by an information system when an attack against the information system is underway, the pre-event stage being a stage of a progress of an attack before the event is observed, the post-event stage being a stage of a progress of an attack after the event is observed, to execute a process for detecting an attack on one or more monitored target apparatuses that comprises:

receiving an observed event notice from one of the one or more monitored target apparatuses, the observed event notice including information notifying an observed event which is observed by the information system;

acquiring corresponding event stage information describing the observed event received in the observed event notice information;

determining whether attack activity status information has been stored for the observed event;

creating, in response to a determination that no attack activity status information has been stored for the observed event, new attack activity status information for the observed event based on the corresponding event stage information;

updating, in response to a determination that attack activity status information has been stored for the observed event, an accumulated attack likelihood in the stored attack activity status information;

acquiring the accumulated attack likelihood for the observed event from the attack activity status information corresponding to the observed event;

notifying a user of an occurrence of an attack if the acquired accumulated attack likelihood is greater than a predefined value;

determining, if the acquired accumulated attack likelihood is less than or equal to the predefined value, a predicted observation event that can occur next by acquiring a post-event stage of the observed event from the corresponding event stage information, acquiring event stage information, including attack activity definition information, for an event corresponding to the acquired post-event stage that describes a pre-event stage corresponding to the acquired post-event stage of the observed event, determining whether pre-event stage conditions of the acquired attack activity definition information have been satisfied, and setting as the predicted observation event the event corresponding to the acquired post-event stage if the pre-event stage conditions have been satisfied.

* * * * *